US012766690B2

(12) United States Patent
Sasaki et al.

(10) Patent No.: US 12,766,690 B2
(45) Date of Patent: Oct. 20, 2026

(54) TOOL SYSTEM WITH IMAGE-BASED IDENTIFICATION OF A WORK TARGET

(71) Applicant: NEXRA Field Works Co., Ltd., Osaka (JP)

(72) Inventors: Ryosuke Sasaki, Osaka (JP); Masanori Kurita, Osaka (JP); Mutsuhiro Yamanaka, Osaka (JP); Takayuki Nii, Osaka (JP); Shinsuke Ueda, Osaka (JP); Satoshi Kajiyama, Osaka (JP)

(73) Assignee: NEXRA FIELD WORKS CO., LTD., Osaka (JP)

( * ) Notice: Subject to any disclaimer, the term of this patent is extended or adjusted under 35 U.S.C. 154(b) by 724 days.

(21) Appl. No.: 18/002,407

(22) PCT Filed: May 10, 2021

(86) PCT No.: PCT/JP2021/017717
§ 371 (c)(1),
(2) Date: Dec. 19, 2022

(87) PCT Pub. No.: WO2022/004132
PCT Pub. Date: Jan. 6, 2022

(65) Prior Publication Data

US 2023/0234203 A1 Jul. 27, 2023

(30) Foreign Application Priority Data

Jun. 30, 2020 (JP) ................................ 2020-113578

(51) Int. Cl.
*B25F 5/00* (2006.01)
*G06V 20/50* (2022.01)
(Continued)

(52) U.S. Cl.
CPC ................ *B25F 5/00* (2013.01); *G06V 20/50* (2022.01); *B25B 21/02* (2013.01); *B25B 23/1475* (2013.01)

(58) Field of Classification Search
CPC .......... B25F 5/00; G06V 20/50; B25B 21/02; B25B 23/1475
See application file for complete search history.

(56) References Cited

U.S. PATENT DOCUMENTS

2007/0196784 A1* 8/2007 Bochi ................ A61B 17/1626 433/114
2011/0190936 A1 8/2011 Koeder et al.
(Continued)

FOREIGN PATENT DOCUMENTS

CN 110883736 A 3/2020
DE 102014205215 A1 9/2015
(Continued)

OTHER PUBLICATIONS

International Search Report dated Jul. 21, 2021 issued in International Patent Application No. PCT/JP2021/017717, with English translation.
(Continued)

*Primary Examiner* — Rami R Okasha
(74) *Attorney, Agent, or Firm* — Rimon P.C.

(57) ABSTRACT

A tool system includes a tool, an image capturing unit, a processing unit, and a set state detection unit. The tool is a portable tool including a driving unit to be activated with power supplied from a power source. The image capturing unit is provided for the tool and generates a captured image. The processing unit intermittently performs identification processing of identifying a work target based on the captured image. The set state detection unit detects a state where the tool is set in place on the work target.

16 Claims, 7 Drawing Sheets

(51) Int. Cl.

| | |
|---|---|
| *B25B 21/02* | (2006.01) |
| *B25B 23/147* | (2006.01) |

(56) References Cited

U.S. PATENT DOCUMENTS

| | | | |
|---|---|---|---|
| 2012/0163932 | A1 | 6/2012 | Schmidt et al. |
| 2014/0267685 | A1 | 9/2014 | Kahle et al. |
| 2014/0293041 | A1* | 10/2014 | Steinlechner ............. G06T 7/13 348/95 |
| 2016/0048122 | A1 | 2/2016 | Lukosz et al. |
| 2017/0197302 | A1 | 7/2017 | Kobayashi |
| 2017/0311037 | A1 | 10/2017 | Ohmura et al. |
| 2017/0320183 | A1* | 11/2017 | Rola .................. B23Q 17/2457 |
| 2019/0217455 | A1 | 7/2019 | Kobayashi |
| 2019/0301131 | A1* | 10/2019 | Hendron ................. E02F 9/265 |
| 2020/0078918 | A1 | 3/2020 | Yoshikane et al. |
| 2020/0261992 | A1 | 8/2020 | Frank et al. |
| 2020/0282501 | A1* | 9/2020 | Thompson ........... B23Q 9/0007 |
| 2021/0205974 | A1* | 7/2021 | Hashimoto .............. B28D 1/14 |
| 2022/0126427 | A1 | 4/2022 | Kobayashi |
| 2022/0221834 | A1 | 7/2022 | Dobashi et al. |
| 2023/0074668 | A1* | 3/2023 | Rivers .................... G05B 19/25 |

FOREIGN PATENT DOCUMENTS

| | | | |
|---|---|---|---|
| FR | 3076234 | A1 | 7/2019 |
| JP | 2015-110254 | A | 6/2015 |
| JP | 2015-229210 | A | 12/2015 |
| JP | 2019-042860 | A | 3/2019 |
| JP | 2019-144965 | A | 8/2019 |
| WO | 2011/035950 | A1 | 3/2011 |
| WO | 2013/099373 | A1 | 7/2013 |
| WO | 2016/072045 | A1 | 5/2016 |
| WO | 2016/125366 | A1 | 8/2016 |
| WO | 2018/123433 | A1 | 7/2018 |
| WO | 2019/063685 | A1 | 4/2019 |

OTHER PUBLICATIONS

International Search Report dated Jul. 27, 2021 issued in International Patent Application No. PCT/JP2021/017718, with English translation.

Extended European Search Report dated Oct. 11, 2023 issued in the corresponding European Patent Application No. 21834051.1.

First Office Action and Search Report received in the corresponding Chinese Patent Application No. 202180044774.2, dated Jan. 17, 2025.

Office Action received in corresponding European Patent Application No. 21834051.1, dated Feb. 21, 2025.

* cited by examiner

TOOL SYSTEM WITH IMAGE-BASED IDENTIFICATION OF A WORK TARGET

CROSS-REFERENCE OF RELATED APPLICATIONS

This application is the U.S. National Phase under 35 U.S.C. § 371 of International Patent Application No. PCT/JP2021/017717, filed on May 10, 2021, which in turn claims the benefit of Japanese Patent Application No. 2020-113578, filed on Jun. 30, 2020, the entire disclosures of which Applications are incorporated by reference herein.

TECHNICAL FIELD

The present disclosure generally relates to a tool system, a tool, a work target identification system, a work target identification method, and a program. More particularly, the present disclosure relates to a tool system for use in a portable tool, a portable tool, a work target identification system, a work target identification method, and a program.

BACKGROUND ART

Patent Literature 1 discloses a tool system including a portable tool having a driving unit to be activated with power supplied from a battery pack and an image capturing unit. The image capturing unit is arranged to cover, for example, a socket, attached to an output shaft of the tool, within its image capturing range. The image capturing unit captures an image of a work target (which may be, for example, an object or a place on which work is conducted using the tool) while the work is conducted using the tool.

According to Patent Literature 1, the image captured by the image capturing unit is used to identify a work target on which the tool is set in place (i.e., the work target that has been arranged to make the tool ready to start working on the work target). The tool system compares the captured image generated by the image capturing unit with a plurality of reference images stored in an image storage unit and thereby identifies the work target shot in the captured image.

If the tool system of Patent Literature 1 attempts to identify the work target shot in the captured image while the image capturing unit is operating, then the power consumption increases.

CITATION LIST

Patent Literature

Patent Literature 1: JP 2019-042860 A

SUMMARY OF INVENTION

In view of the foregoing background, it is therefore an object of the present disclosure to provide a tool system, a tool, a work target identification system, a work target identification method, and a program, all of which are configured or designed to cut down power consumption.

To overcome this problem, a tool system according to an aspect of the present disclosure includes a tool, an image capturing unit, a processing unit, and a set state detection unit. The tool is a portable tool including a driving unit to be activated with power supplied from a power source. The image capturing unit is provided for the tool and generates a captured image. The processing unit intermittently performs identification processing of identifying a work target based on the captured image. The set state detection unit detects a state where the tool is set in place on the work target.

A tool according to another aspect of the present disclosure is designed to be used in the tool system described above. The tool includes the driving unit and the image capturing unit.

A work target identification system according to still another aspect of the present disclosure includes a processing unit and a set state detection unit. The processing unit intermittently performs identification processing of identifying a work target based on a captured image generated by an image capturing unit. The image capturing unit is provided for a tool which is a portable tool including a driving unit to be activated with power supplied from a power source. The set state detection unit detects a state where the tool is set in place on the work target.

A work target identification method according to yet another aspect of the present disclosure includes an identification processing step and a set state detection step. The identification processing step includes intermittently performing identification processing of identifying a work target based on a captured image generated by an image capturing unit. The image capturing unit is provided for a tool which is a portable tool including a driving unit to be activated with power supplied from a power source. The set state detection step includes detecting a state where the tool is set in place on the work target.

A program according to yet another aspect of the present disclosure is designed to cause one or more processors to perform the work target identification method described above.

DESCRIPTION OF EMBODIMENTS

Figure 1:
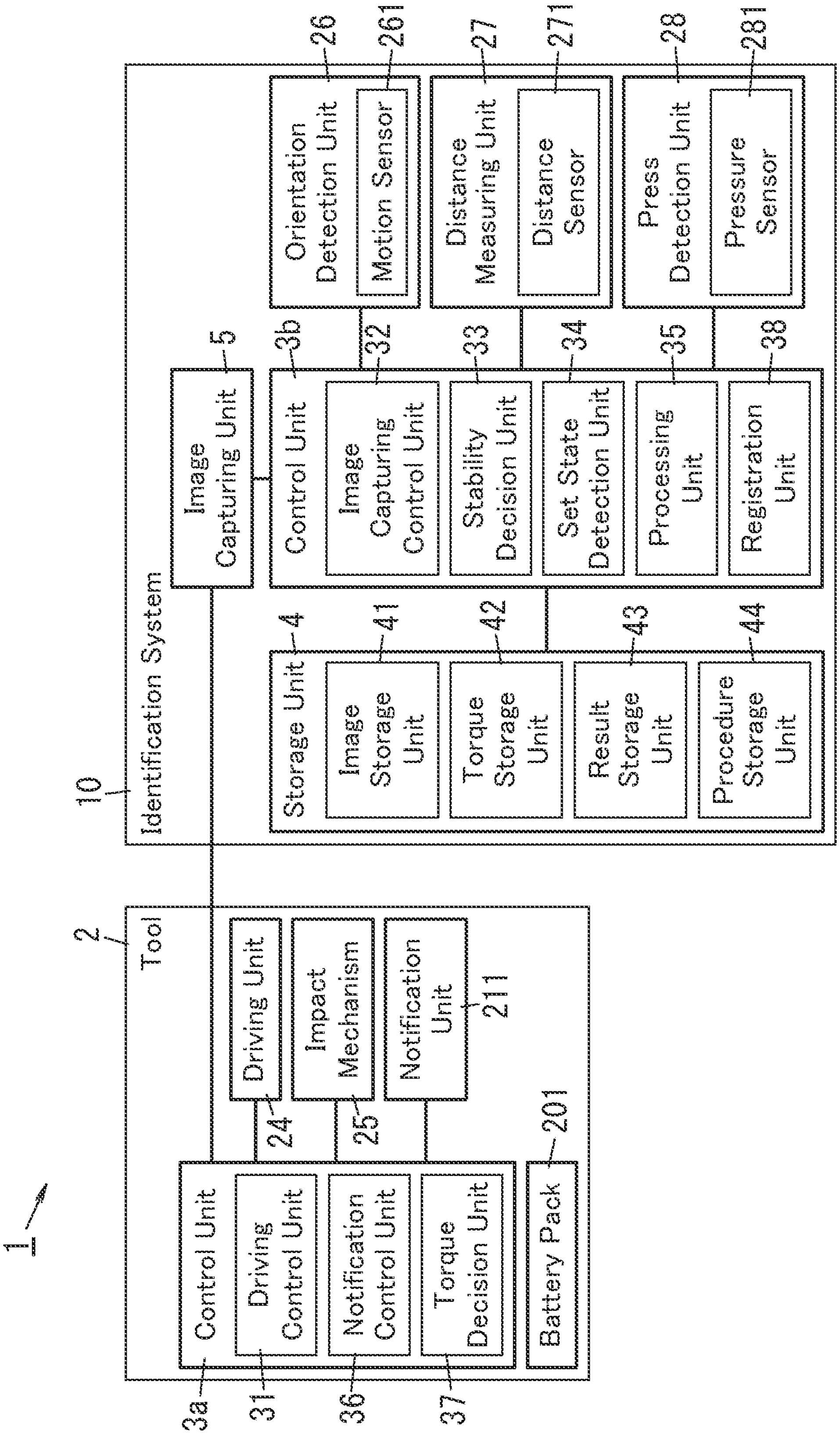
FIG. 1 is a block diagram of a tool system according to an exemplary embodiment.

A preferred embodiment of the present disclosure will now be described in detail with reference to the accompanying drawings. In the following description of embodiments, any pair of constituent elements, having the same function, will be designated by the same reference numeral and description thereof will be omitted herein to avoid redundancy.

EMBODIMENT

(1) Overview

First, an overview of a tool system 1 according to an exemplary embodiment will be described with reference to FIG. 1.

A tool system 1 according to this embodiment includes a portable tool 2. The tool 2 includes a driving unit 24 including a motor, for example. The driving unit 24 is activated with motive power (such as electric power) supplied from a power source such as a battery pack 201. Examples of the tools 2 of this type include an impact wrench, a nut runner, an oil pulse wrench, a screwdriver (including an impact screwdriver), a drill, a drill-screwdriver, and various other types of tools. Using a tool 2 of this type allows the user to perform various types of machining work such as attaching a fastening member (such as a bolt or a nut) onto a workpiece (target of machining work) as a work target or opening a hole through the workpiece.

In addition, in the tool system 1 according to this embodiment, an image capturing unit 5 is provided for the tool 2. The image capturing unit 5 generates a captured image. The image capturing unit 5 covers, in its image capturing range (field of view), a socket 242 (refer to FIG. 2A) attached to an output shaft 241 (refer to FIG. 2A) of the tool 2, for example. Thus, while the user is performing work using the tool 2, the image capturing unit 5 captures an image of the work target and generates a captured image.

Thus, the tool system 1 according to this embodiment allows the work target to be identified based on, for example, the captured image generated by the image capturing unit 5, thus enabling, for example, determining whether or not the work that the user is performing using the tool 2 follows the working procedure. In addition, the tool system 1 also enables determining, based on the captured image generated by the image capturing unit 5, whether the work that has been done on the work target is good or bad, notifying the user of a working instruction according to the work target, and storing the image as a log (i.e., record of work). As can be seen, using the image (captured image) generated by the image capturing unit 5 provided for the tool 2 enables, for example, supporting the user with his or her work using the tool 2 or managing his or her work.

The tool system 1 according to this embodiment includes a set state detection unit 34 and a processing unit 35 as shown in FIG. 1. That is to say, the tool system 1 includes the tool 2, the image capturing unit 5, the set state detection unit 34, and the processing unit 35. The tool 2 includes a driving unit 24 to be activated with power supplied from a power source. The image capturing unit 5 is provided for the tool 2 and generates a captured image. The set state detection unit 34 detects a state where the tool 2 is set in place on a work target. The processing unit 35 intermittently performs identification processing of identifying the work target based on the captured image.

This configuration allows the tool system 1 to identify a work target based on a captured image after having detected a state where the tool 2 is set in place on the work target. This enables reducing the number of times the tool system 1 performs the identification processing in vain while the image capturing unit 5 is not shooting an area surrounding the work target (e.g., while the tool 2 is being carried by the user with him or her). Thus, the tool system 1 according to this embodiment may cut down the power consumption.

(2) Detailed Configuration

Next, a detailed configuration for the tool system 1 according to this embodiment will be described with reference to FIGS. 1-2B.

(2.1) Premise

The tool system 1 according to this embodiment may be used, for example, in an assembly line for performing assembling work on workpieces (targets of machining work) at a factory. In particular, in this embodiment, the tool 2 included in the tool system 1 is supposed to be a fastening tool such as an impact wrench for use to tighten a fastening member (such as a bolt or a nut). Specifically, this embodiment is supposed to be applied to a situation where a single workpiece has a plurality of portions to be fastened, thus requiring the user to attach a fastening member onto each of those portions to be fastened by using a tool 2 in a single workplace.

As used herein, the term "intermittently" refers to not only a situation where some event occurs at regular intervals but also a situation where the event occurs at irregular intervals as well. Therefore, the phrase "performing identification processing intermittently" means not only performing the identification processing at regular intervals but also performing the identification processing at irregular intervals as well. In addition, the phrase "performing identification processing intermittently" further means performing the identification processing when a decision is made by a stability decision unit 33 that the captured image be stabilized. Furthermore, the phrase "performing identification processing intermittently" further means performing the identification processing when the set state detection unit 34 detects the state where the tool 2 is set in place on the work target.

As used herein, the "portion to be fastened" refers to a part of the workpiece, to which the fastening member is attached. For example, if the fastening member is a bolt, then the portion to be fastened is an area surrounding, and covering, a screw hole to which the fastening member is attached and tightened. That is to say, in this embodiment, a single workpiece has a plurality of such portions to be fastened.

As used herein, the "work target" refers to an object or a working area on which work is supposed to be performed using the tool 2. In particular, a work target on which the tool 2 is currently set in place will be hereinafter sometimes referred to as a "current work target." As used herein, the clause "the tool 2 is currently set in place" refers to a situation where the tool 2 has been placed so as to be ready to perform work on the work target. Also, as used herein, the clause "the tool 2 is currently set in place" refers to not only a situation where the tool 2 is already in contact with the work target but also a situation where the tool 2 is on the verge of being brought into contact with the work target (i.e., a situation where the tool 2 is approaching the work target). That is to say, when the tool 2 is set in place on the work target, the tool 2 may be already in contact with the work target or may be still out of contact with the work target. In this embodiment, each of the plurality of portions to be fastened of a single workpiece is supposed to be the work target as an example.

As used herein, the "captured image" refers to an image captured by the image capturing unit 5 and includes a still picture (still image) and a moving picture (motion picture). The "moving picture" further includes a group of still pictures (frames) captured by stop-motion shooting, for example. The captured image does not have to be output data itself provided by the image capturing unit 5. For example, the captured image may have been subjected, as needed, to data compression, conversion into another data format, cropping an image portion from the image captured by the image capturing unit 5, focus adjustment, brightness adjustment, contrast adjustment, or any of various other types of image processing. In this embodiment, the captured image is supposed to be a full-color moving picture, for example. Also, as used herein, the clause "the captured image is stabilized" may refer to a situation where the image is captured with the tool 2 set in place on the work target and with no shake caused in the image capturing unit 5. In addition, the clause "the captured image is stabilized" may also refer to a situation where the image is captured with the image capturing control such as automatic exposure (AE) and auto white balance (AWB) of the image capturing unit 5 stabilized.

Also, as used herein, the "reference image" refers to an image generated based on the captured image generated by the image capturing unit 5. In this embodiment, the "reference image" is supposed to be a full-color still picture as an example. As used herein, the "plurality of reference images corresponding to a plurality of work targets" refers to not only a situation where the plurality of reference images correspond one to one to the plurality of work targets but also a situation where the plurality of reference images correspond one to multiple to a plurality of work targets. Alternatively, each of a plurality of work targets may be associated with a plurality of reference images shot by capturing the work target from various angles or in multiple different sizes.

Also, as used herein, if something is "provided for" something else, then the former may be built in (e.g., integrated inseparably with) the latter or may be just attached as an external member to the latter (e.g., removably secured with a coupler, for example). As used herein, "attaching externally" means attaching an auxiliary device separately to a machine, for example, to expand its functionality. Specifically, the clause "externally attaching a first device to a second device" refers to not only attaching the first device itself as an auxiliary device to the second device but also attaching a third device in which the first device is built as an auxiliary device to the second device as well. That is to say, the image capturing unit 5 provided for the tool 2 may be built in the tool 2 or just attached as an external member to the tool 2, whichever is appropriate. The image capturing unit 5 according to this embodiment is built in the tool 2.

Furthermore, as used herein, the "working procedure" means the procedure of the work to be performed using the tool 2. For example, if a series of working process steps to be performed on either a single work target or a plurality of work targets is defined to be a single working process, then the working procedure indicates the order in which the working process steps are supposed to be performed on the single work target or the plurality of work targets through the working process. More specifically, if the instruction on the work to be done on a single work target is a "working instruction," then the working procedure is information indicating either a single working instruction or a plurality of working instructions for the single working process along with the order in which the working process steps are supposed to be performed. In other words, the working procedure indicates which of the single or plurality of working processes the work target corresponds to and also indicates the place in the corresponding working process. In the following description of this embodiment, the working procedure is supposed to define in which order the work (including a plurality of working process steps) should be performed on a plurality of work targets in a single workpiece.

(2.2) Configuration for Tool System

As shown in FIG. 1, the tool system 1 according to this embodiment includes the tool 2 and a work target identification system 10.

(2.2.1) Configuration for Tool

First, a configuration for the tool 2 in the tool system 1 according to this embodiment will be described with reference to FIGS. 1, 2A, and 2B. The tool 2 includes a control unit 3*a*, a driving unit 24, an impact mechanism 25, a notification unit 211, and a battery pack 201 (refer to FIG. 1).

The tool 2 according to this embodiment is an electric tool that activates the driving unit 24 by using electrical energy. In particular, in this embodiment, the tool 2 is supposed to be an impact wrench. Such a tool 2 may be used to perform fastening work of attaching a fastening member onto a work target.

In this case, the tool 2 is designed to activate the driving unit 24 with the electric power (electrical energy) supplied from the battery pack 201 by using the battery pack 201 as a power source. In this embodiment, the battery pack 201 is supposed to be counted among the constituent elements of the tool 2. However, the battery pack 201 does not have to be one of the constituent elements of the tool 2. In other words, the battery pack 201 may be counted out of the constituent elements of the tool 2.

The tool 2 further includes a body 20. In the body 20, housed are the driving unit 24 and the impact mechanism 25. In addition, in the tool 2 according to this embodiment, the control unit 3*a* and the notification unit 211 are also housed in the body 20.

The body 20 of the tool 2 includes a barrel 21, a grip 22, and an attachment 23. The barrel 21 is formed in a cylindrical shape (e.g., circular cylindrical shape in this embodiment). The grip 22 protrudes along a normal to a part of the circumferential surface of the barrel 21 (i.e., along the radius of the barrel 21). To the attachment 23, the battery pack 201 is attached removably. In other words, the barrel 21 and the attachment 23 are coupled together via the grip 22.

At least the driving unit 24 is housed in the barrel 21. The driving unit 24 includes a motor. The driving unit 24, is configured to be activated with the power supplied from the battery pack 201 as a power source to the motor. An output shaft 241 protrudes from one axial end surface of the barrel 21. The output shaft 241 turns around a rotational axis Ax1, which is aligned with the direction in which the output shaft 241 protrudes, as the driving unit 24 is activated. That is to say, the driving unit 24 drives the output shaft 241 in rotation around the rotational axis Ax1. In other words, as the driving unit 24 is activated, torque is applied to the output shaft 241, thereby causing the output shaft 241 to turn.

A cylindrical socket 242 for rotating a fastening member (such as a bolt or a nut) is attached removably onto the output shaft 241. The socket 242 turns along with the output shaft 241 around the rotational axis Ax1. The size of the socket 242 attached to the output shaft 241 may be selected as appropriate by the user according to the size of the fastening member. According to such a configuration, activating the driving unit 24 causes the output shaft 241 to turn, thus causing the socket 242 to rotate along with the output shaft 241. If the socket 242 is fitted onto a fastening member at this time, then the fastening member turns along with the socket 242, thus having the work of tightening or loosening the fastening member done. In this manner, the tool 2 may have the work of tightening or loosening the fastening member done by activating the driving unit 24.

Optionally, a socket anvil may also be attached, instead of the socket 242, onto the output shaft 241. The socket anvil is also attached removably to the output shaft 241. This allows a bit (such as a screwdriver bit or a drill bit) to be attached to the output shaft 241 via the socket anvil.

The tool 2 includes the impact mechanism 25 as described above. The impact mechanism 25 is configured to, when (the work value of) fastening torque exceeds a predetermined level, apply impacting force in the rotational direction to the output shaft 241. This allows the tool 2 to apply greater fastening torque to the fastening member.

The grip 22 is a portion to be gripped by the user while he or she is performing the work. The grip 22 is provided with a trigger switch 221 (operating unit) and a forward/reverse switch 222. The trigger switch 221 is a switch for controlling the ON/OFF states of the driving unit 24 to be activated or deactivated. The trigger switch 221 has an initial position and an ON position. When the trigger switch 221 is pressed or puled by the user to the ON position, the driving unit 24 is activated. In addition, the trigger switch 221 allows adjusting a rotational velocity of the output shaft 241 according to how deep the trigger switch 221 is pulled (i.e., according to the manipulative variable of the trigger switch 221). The forward/reverse switch 222 is a switch for switching the rotational direction of the output shaft 241 from the clockwise direction to the counterclockwise direction, and vice versa.

The attachment 23 is formed in the shape of a compressed rectangular parallelepiped. The battery pack 201 is attached removably to one side, opposite from the grip 22, of the attachment 23.

The battery pack 201 includes a case 202 made of a resin and formed in a rectangular parallelepiped shape. The case 202 houses a rechargeable battery (such as a lithium-ion battery) inside. The battery pack 201 supplies electric power to the driving unit 24, the control unit 3*a*, the notification unit 211, the work target identification system 10, and other constituent members.

The attachment 23 is also provided with an operating panel 231. The operating panel 231 may include a plurality of press button switches 232 and a plurality of LEDs (light-emitting diodes) 233, for example. The operating panel 231 allows the user to enter various types of settings for, and confirm the state of, the tool 2, for example. That is to say, by operating the press button switches 232 of the operating panel 231, the user is allowed to change the operation mode of the tool 2 or the check the remaining capacity of the battery pack 201, for example.

The attachment 23 further includes a light-emitting unit 234 for shooting. The light-emitting unit 234 includes an LED, for example. The light-emitting unit 234 emits light toward the work target while the user is performing work using the tool 2. The light-emitting unit 234 may be turned ON and OFF by operating the operating panel 231. Alternatively, the light-emitting unit 234 may also be lit automatically when the trigger switch 221 turns ON.

The notification unit 211 may be implemented as an LED, for example. The notification unit 211 may be provided for the other end, opposite from the output shaft 241, of the barrel 21 of the body 20 so as to be easily viewed by the user during the work (refer to FIG. 2B).

In this case, the tool 2 according to this embodiment has, as its operation modes, at least a working mode and a registration mode. As used herein, the "working mode" refers to an operation mode in which the user performs work using the tool 2. The registration mode refers herein to an operation mode in which a reference image corresponding to the work target is generated. The operation mode may be switched by, for example, pressing the press button switches 232 and other members of the operating panel 231. Alternatively, the operation mode may also be switched by operating another member, such as the trigger switch 221 or a dip switch, provided separately from the operating panel 231.

The control unit 3*a* may include, as a major constituent element thereof, a microcontroller including one or more processors and one or more memories, for example. The microcontroller performs the function of the control unit 3*a* by making the one or more processors execute a program stored in the one or more memories. The program may be stored in advance in the memory. Alternatively, the program may also be distributed after having been stored in a non-transitory storage medium such as a memory card or downloaded via a telecommunications line. In other words, the program is designed to cause the one or more processors to function as the control unit 3*a*.

The control unit 3*a* performs the functions of a driving control unit 31, a notification control unit 36, and a torque decision unit 37, for example. Note that if no operating command is entered into the trigger switch 221 or the operating panel 231 for a certain period of time, the control unit 3*a* enters a sleep mode. The control unit 3*a* is activated when any operating command is entered, during the sleep mode, into either the trigger switch 221 or the operating panel 231.

The driving control unit 31 controls the driving unit 24. Specifically, the driving control unit 31 activates the driving unit 24 to make the output shaft 241 turn at the rotational velocity determined by the press depth of the trigger switch 221 and in a rotational direction set by the forward/reverse switch 222.

The driving control unit 31 also controls the driving unit 24 such that the fastening torque becomes equal to a torque setting. The driving control unit 31 has a torque estimating function of estimating the magnitude of the fastening torque. In this embodiment, the driving control unit 31 estimates, until the estimated value of the fastening torque reaches a seating determination level, the magnitude of the fastening torque based on a rotational velocity or any other parameter of the driving unit 24 (motor). When the estimated value of the fastening torque reaches the seating determination level, the driving control unit 31 estimates the magnitude of the fastening torque based on the number of strokes by the impact mechanism 25. When finding the number of stokes by the impact mechanism 25 has reached a threshold number of times based on the torque setting, the driving control unit 31 determines that the fastening torque should have reached a torque setting, and stops running the driving unit 24 (i.e., the motor). This allows the tool 2 to fasten the fastening member with fastening torque that exactly matches the torque setting.

The notification control unit 36 controls the notification unit 211. The notification control unit 36 preferably lights the notification unit 211 differently in a situation where the decision of the identification processing performed by the processing unit 35 is disagreement from in a situation where the decision made by the processing unit 35 is agreement. For example, if the decision made by the processing unit 35 is disagreement, the notification control unit 36 may light the notification unit 211 in red. On the other hand, if the decision made by the processing unit 35 is agreement, then the notification control unit 36 may light the notification unit 211 in green. This allows the user to recognize, by checking the lighting state of the notification unit 211 with the eye, whether the work target conforms to the working procedure or not. Optionally, when the trigger switch 221 is pulled in a state where the decision made by the processing unit 35 is disagreement, the notification control unit 36 may light the notification unit 211.

The torque decision unit 37 is configured to determine whether or not the fastening torque is a normal one when the fastening member is attached to the portion to be fastened. In this case, the torque decision unit 37 preferably determines, in accordance with the working instruction defined by the working procedure, whether or not the fastening torque is a normal one. Specifically, the working instruction defined by the working procedure includes a target torque value associated with the work target. This allows the torque decision unit 37 to determine, by comparing the target torque value included in the working instruction with the fastening torque, whether or not the work is being performed with the fastening torque specified by the working instruction.

If the driving control unit 31 has deactivated the driving unit 24 on detecting that the number of strokes by the impact mechanism 25 has reached the threshold number of times, for example, then the torque decision unit 37 decides that the fastening torque should be normal. On the other hand, if the driving control unit 31 has deactivated the driving unit 24 by turning the trigger switch 221 OFF before the number of strokes by the impact mechanism 25 reaches the threshold number of times, for example, then the torque decision unit 37 decides that the fastening torque should be insufficient (abnormal). The torque decision unit 37 also performs result storage processing of storing the decision results in a result storage unit 43 in association with the portion to be fastened.

(2.2.2) Configuration for Work Target Identification System

Next, a configuration for the work target identification system 10 will be described with reference to FIGS. 1, 2A, and 2B. The work target identification system 10 includes the image capturing unit 5, a control unit 3*b*, a storage unit 4, an orientation detection unit 26, a distance measuring unit 27, and a press detection unit 28.

The control unit 3*b*, the storage unit 4, the image capturing unit 5, the orientation detection unit 26, the distance measuring unit 27, and the press detection unit 28 are housed in the body 20 of the tool 2. In this embodiment, the image capturing unit 5 and the distance measuring unit 27 may be housed in the barrel 21, for example. The press detection unit 28 is housed in a part, located closer to the rear surface (i.e., opposite from the surface with the trigger switch 221), of the grip 22. The control unit 3*b*, the storage unit 4, and the orientation detection unit 26 are housed in either the grip 22 or the attachment 23.

The image capturing unit 5 generates data as a captured image. The image capturing unit 5 may be, for example, a camera including an image sensor and a lens. In this embodiment, the image capturing unit 5 may be housed in (the barrel 21 of) the body 20 of the tool 2. The image capturing unit 5 is provided to be oriented toward the tip of the output shaft 241 to capture an image of the work target while the user is performing the work using the tool 2.

Figure 2A:
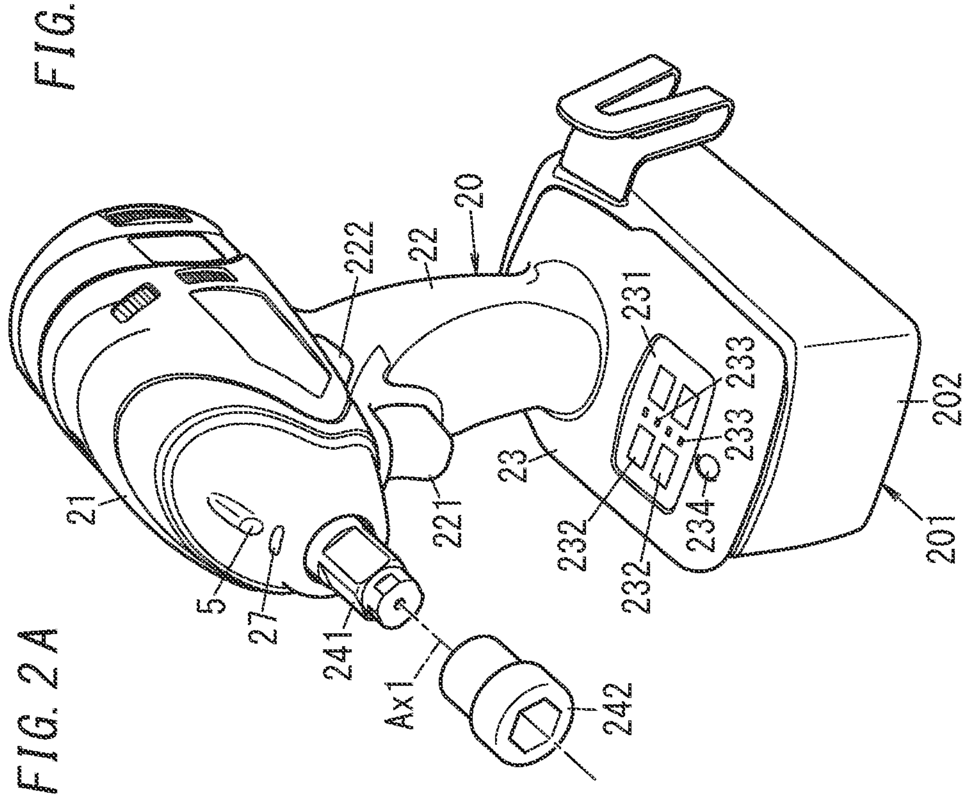
FIG. 2A is a perspective view illustrating the appearance, as viewed from one angle, of the tool system.
Figure 2B:
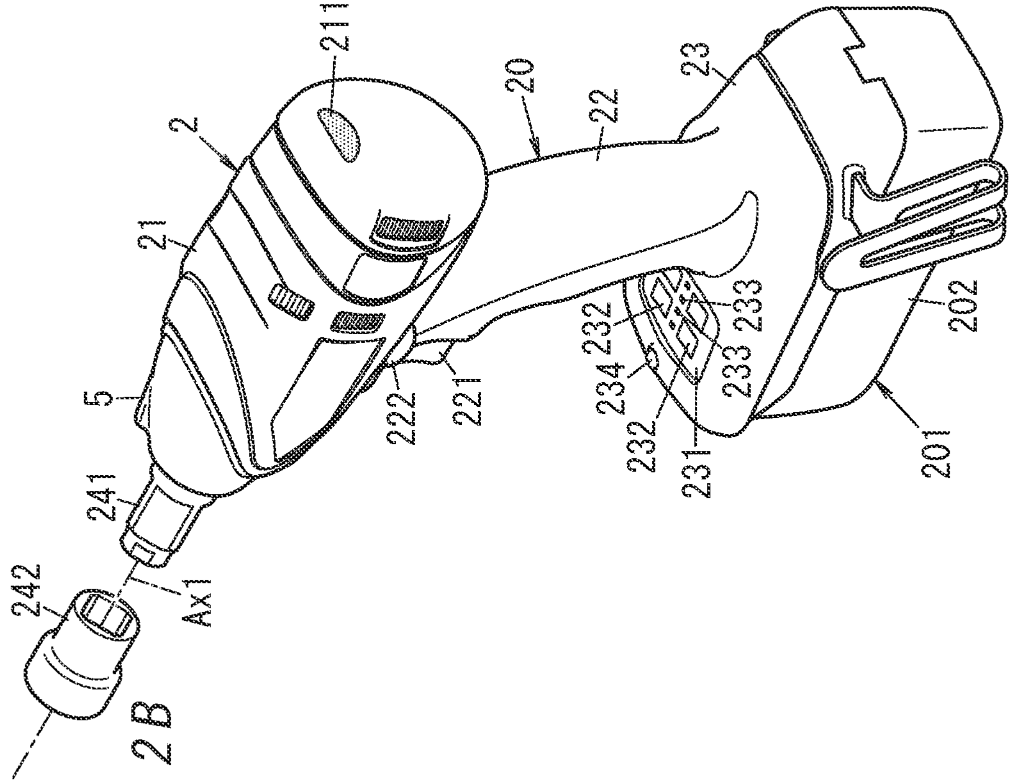
FIG. 2B is a perspective view illustrating the appearance, as viewed from another angle, of the tool system.

Specifically, the image capturing unit 5 is provided in a tip portion of the barrel 21 to be oriented toward the tip of the output shaft 241 (i.e., toward the socket 242) such that the socket 242 attached to the output shaft 241 falls within the image capturing range (refer to FIGS. 2A and 2B). The optical axis of the image capturing unit 5 is arranged to be aligned with the rotational axis Ax1 of the output shaft 241. In this embodiment, the image capturing unit 5 is arranged such that the optical axis thereof is located within a predetermined distance from the rotational axis Ax1 of the output shaft 241 and that the rotational axis Ax1 and the optical axis are substantially parallel to each other. Note that the image capturing unit 5 does not have to generate the captured image such that the socket 242 attached to the output shaft 241 falls within the image capturing range thereof. Rather the image capturing unit 5 only needs to generate a captured image for identifying the current work target. As used herein, the "captured image for identifying the current work target" refers to an image generated when the workpiece in a state where the tool 2 is currently set in place on the work target is shot by the image capturing unit 5. According to the present disclosure, the work target on which the tool 2 is set in place is supposed to be shot in the captured image. The captured image has only to be an image that allows the user to identify the current work target. Thus, the work target on which the tool 2 is currently set in place does not have to be covered within the image capturing range of the captured image.

The orientation detection unit 26 detects the orientation of the tool 2. The orientation detection unit 26 may include, for example, a motion sensor 261 such as an acceleration sensor or a gyrosensor. In this embodiment, the orientation detection unit 26 is housed in the (grip 22 or attachment 23 of the) body 20 of the tool 2 as described above. In this embodiment, the orientation detection unit 26 includes, for example, a triaxial acceleration sensor and a triaxial gyrosensor as the motion sensors 261. The triaxial acceleration sensor detects acceleration in each of three axes that are perpendicular to each other and outputs an electrical signal representing the acceleration thus detected. The triaxial gyrosensor detects an angular velocity around each of three axes that are perpendicular to each other and outputs an electrical signal representing the angular velocity thus detected.

The orientation detection unit 26 may detect the gravitational direction based on, for example, the output of the acceleration sensor and detect, for example, the orientation of the tool 2 by reference to the gravitational direction. In addition, the orientation detection unit 26 may also detect, based on the output of the gyrosensor, the angular velocity of the tool 2 that is moving while rotating and further detect, based on the integral result of the angular velocity, the rotational angle of the tool 2, for example. For instance, the orientation detection unit 26 may detect such an orientation of the tool 2 that makes the direction in which the grip 22 protrudes from the barrel 21 downward (corresponding to the gravitational direction) and such an orientation of the tool 2 that makes the direction in which the grip 22 protrudes from the barrel 21 upward distinguishably from each other. As used herein, the "orientation of the tool 2" refers to the orientation of the tool 2 which is determined by the respective rotational angles (e.g., the roll, pitch, and yaw angles) around the three axes with respect to the gravitational direction as the reference, for example. The orientation detection unit 26 detects the motion and orientation of the tool 2 based on the outputs of the motion sensors 261 (including the acceleration sensor and the gyrosensor) and provides the results of detection as orientation information about the motion and orientation of the tool 2 to the set state detection unit 34 of the control unit 3*b* as needed.

The distance measuring unit 27 measures the distance between the tool 2 and the work target. The distance measuring unit 27 includes, for example, a distance sensor 271 such as a radio detection and ranging (RADAR) sensor, a light detection and ranging (LiDAR) sensor, or an ultrasonic sensor. The LiDAR sensor may be an infrared sensor, for example. In this embodiment, the distance measuring unit 27 is housed in the (barrel 21 of the) body 20 of the tool 2 as described above. Specifically, the distance measuring unit 27, as well as the image capturing unit 5, is provided in a tip portion of the barrel 21 to be oriented toward the tip of the output shaft 241 (i.e., toward the socket 242). In this embodiment, the distance measuring unit 27 includes an ultrasonic sensor, for example. The ultrasonic sensor is a time-of-flight distance sensor for measuring the distance to the target (such as the workpiece or the work target) by emitting an ultrasonic wave and measuring the time it takes for the ultrasonic wave reflected from the target to be received. The ultrasonic sensor outputs an electrical signal representing the distance thus measured.

The distance measuring unit 27 detects, based on the output of the distance sensor 271, the distance between the work target (or the workpiece) and the tool 2. The distance measuring unit 27 outputs the result of detection, as distance information about the distance between the tool 2 and the work target, to the set state detection unit 34 of the control unit 3*b*.

The press detection unit 28 detects that the tool 2 is pressed against the work target. In this embodiment, the press detection unit 28 is housed in a part, closer to the rear surface, of the (grip 22 of the) body 20 of the tool 2 as described above. The press detection unit 28 according to this embodiment includes a pressure sensor 281 which uses, for example, a metal strain gauge or a semiconductor strain gauge. The pressure sensor 281 detects the pressure applied to the rear surface of the grip 22 and outputs an electrical signal representing the pressure thus detected.

The press detection unit 28 detects, based on the output of the pressure sensor 281, that the tool 2 is pressed against the work target. In this case, the force applied to the rear surface of the grip 22 while the tool 2 is being pressed by the user against the work target is greater than the force applied to the rear surface of the grip 22 while the user is carrying the tool 2 with him or her, for example. Thus, the press detection unit 28 detects, when finding the pressure detected by the pressure sensor 281 equal to or greater than a threshold pressure, that the tool 2 is pressed against the work target. The press detection unit 28 outputs the result of detection, as information about the press of the tool 2, to the set state detection unit 34 of the control unit 3*b*.

The control unit 3*b* may include, as a major constituent element thereof, a microcontroller including one or more processors and one or more memories, for example. The microcontroller performs the function of the control unit 3*b* by making the one or more processors execute a program stored in the one or more memories. The program may be stored in advance in the memory. Alternatively, the program may also be distributed after having been stored in a non-transitory storage medium such as a memory card or downloaded via a telecommunications line. In other words, the program is designed to cause the one or more processors to function as the control unit 3*b*.

The control unit 3*b* performs the functions of an image capturing control unit 32, the stability decision unit 33, the set state detection unit 34, the processing unit 35, and a registration unit 38, for example. Note that if no operating command is entered into the trigger switch 221 or the operating panel 231 for a certain period of time, the control unit 3*b* enters a sleep mode. The control unit 3*b* is activated when any operating command is entered, during the sleep mode, into either the trigger switch 221 or the operating panel 231.

The image capturing control unit 32 is configured to control the image capturing unit 5. When the control unit 3*b* is started, the image capturing control unit 32 according to this embodiment makes the image capturing unit 5 start performing an image capturing operation.

The stability decision unit 33 determines whether the captured image generated by the image capturing unit 5 is stabilized or not. The stability decision unit 33 according to this embodiment performs, while the tool 2 is operating in the working mode, the stability decision processing of determining, based on a plurality of frames included in the captured image, whether the captured image is stabilized or not.

The stability decision unit 33 according to this embodiment calculates the degree of difference between the plurality of frames and decides, when finding the degree of difference equal to or less than a threshold value, that the captured image be stabilized. Specifically, the stability decision unit 33 calculates the degree of difference between the latest frame (current frame) included in the captured image and the previous frame preceding the latest frame. In the following description, the 'latest frame included in the captured image will be hereinafter sometimes referred to as a' "first frame" and the frame preceding the latest frame will be hereinafter sometimes referred to as a "second frame." The stability decision unit 33 calculates the degree of difference as the difference between a luminance value (which may be a density value or a grayscale value) in a particular area in the first frame and a luminance value (which may be a density value or a grayscale value) in its corresponding particular area in the second frame. The stability decision unit 33 calculates the degree of difference using, for example, a sum of squared differences (SSD) or a sum of absolute differences (SAD). In this case, the particular area in the first and second frames may be, for example, an area defined in advance by coordinates in the captured image. The particular area in the first frame and the particular area in the second frame have the same set of coordinates. Also, the number of the particular area(s) defined in the first and second frames needs to be at least one but is preferably plural in order to increase the accuracy of the stability decision processing.

The stability decision unit 33 compares the degree of difference with a threshold value and decides, when finding the degree of difference equal to or less than the threshold value, that the captured image be stabilized. When deciding that the captured image be stabilized, the stability decision unit 33 outputs stability information to the set state detection unit 34 and the processing unit 35. On the other hand, when finding the degree of difference greater than the threshold value, the stability decision unit 33 does not decide that the captured image be stabilized. When not deciding that the captured image be stabilized, the stability decision unit 33 does not output stability information to the set state detection unit 34 or the processing unit 35.

The set state detection unit 34 detects a state where the tool 2 is set in place on the work target. The set state detection unit 34 according to this embodiment performs, when the tool 2 is operating in the working mode, set state detection processing of determining whether the tool 2 is set in place on the work target or not.

The set state detection unit 34 according to this embodiment detects, in accordance with orientation information provided by the orientation detection unit 26, distance information provided by the distance measuring unit 27, and press information provided by the press detection unit 28, the state where the tool 2 is set in place on the work target.

The set state detection unit 34 detects, in accordance with the orientation information provided by the orientation detection unit 26, the state where the tool 2 is set in place on the work target. If the tool's 2 orientation detected by the orientation detection unit 26 is a predetermined orientation, then the set state detection unit 34 detects the state where the tool 2 is set in place on the work target. As used herein, the "predetermined orientation" may refer to, for example, an orientation of the tool 2, of which an angular difference from a reference orientation is equal to or less than a threshold value when the tool's 2 orientation is compared with the reference orientation. Specifically, the predetermined orientation refers to an orientation of the tool 2 in a situation where either the sum or average of the differences between the tool's 2 rotational angles detected around the three axes by the orientation detection unit 26 with respect to a current orientation thereof and its rotational angles defined around the three axes with respect to the reference orientation is equal to or less than a threshold value. Also, the "reference orientation" as used herein refers to such an orientation of the tool 2 that makes the direction in which the grip 22 protrudes from the barrel 21 downward (corresponding to the gravitational direction). The set state detection unit 34 according to this embodiment decides, when finding the average of the differences between the tool's 2 rotational angles detected around the three axes by the orientation detection unit 26 with respect to its current orientation and its rotational angles defined around the three axes with respect to the reference orientation is equal to or less than 5 degrees, that the tool 2 have the predetermined orientation. Note that the "average of the differences between the tool's 2 rotational angles detected around the three axes by the orientation detection unit 26 with respect to its current orientation and its rotational angles defined around the three axes with respect to the reference orientation" will be hereinafter sometimes simply referred to as the "angular difference between the tool's 2 current orientation and its reference orientation." That is to say, the set state detection unit 34 according to this embodiment detects, when finding the average of the differences between the tool's 2 rotational angles detected around the three axes by the orientation detection unit 26 with respect to its current orientation and its rotational angles defined around the three axes with respect to the reference orientation equal to or less than 5 degrees, the state where the tool 2 is set in place on the work target. Alternatively, the set state detection unit 34 may set it as one of the conditions for detecting the state where the tool 2 is set in place on the work target that the average of the differences between the tool's 2 rotational angles detected around the three axes by the orientation detection unit 26 with respect to its current orientation and its rotational angles defined around the three axes with respect to the reference orientation be equal to or less than 5 degrees.

In addition, the set state detection unit 34 also detects, in accordance with the distance information provided by the distance measuring unit 27, the state where the tool 2 is set in place on the work target. Specifically, the set state detection unit 34 detects, when finding the distance detected by the distance measuring unit 27 between the tool 2 and the work target falling within a preset range, the state where the tool 2 is set in place on the work target. Alternatively, the set state detection unit 34 may set it as one of the conditions for detecting the state where the tool 2 is set in place on the work target that the distance between the tool 2 and the work target fall within the preset range. As used herein, the situation where "the distance between the tool 2 and the work target falls within the preset range" refers to a situation where the absolute value of the difference calculated by subtracting the distance detected by the distance measuring unit 27 between the tool 2 and the work target from a reference distance is equal to or less than a threshold distance. As used herein, the "reference distance" refers to a distance defined as a reference for the set state detection unit 34 to detect the state where the tool 2 is set in place on the work target. The reference distance may be, for example, the distance detected by the distance measuring unit 27 between the tool 2 and the work target when a reference image is captured and is associated with the reference image. Also, the reference distance may be somewhat longer than the distance between the distance sensor 271 of the distance measuring unit 27 and the tip of the socket 242. Note that the absolute value of the difference calculated by subtracting the distance detected by the distance measuring unit 27 between the tool 2 and the work target from the reference distance will be hereinafter sometimes simply referred to as a "distance difference."

Furthermore, the set state detection unit 34 also detects, in accordance with the press information provided by the press detection unit 28, the state where the tool 2 is set in place on the work target. Specifically, the set state detection unit 34 detects, when finding the value of the pressure applied to the rear surface of the grip 22 as detected by the press detection unit 28 equal to or greater than a threshold pressure, the state where the tool 2 is set in place on the work target. Alternatively, the set state detection unit 34 may set it as one of the conditions for detecting the state where the tool 2 is set in place on the work target that the value of the pressure applied to the rear surface of the grip 22 be equal to or greater than the threshold pressure.

Furthermore, the set state detection unit 34 according to this embodiment further detects, based on the press depth of the trigger switch 221, the state where the tool 2 is set in place on the work target. Specifically, the set state detection unit 34 detects, when finding the trigger switch 221 be pressed halfway by the user, the state where the tool 2 is set in place on the work target.

As used herein, the phrase "pressed halfway" refers to a state where the trigger switch 221 has been pressed halfway between the initial position and the ON position. Specifically, to be "pressed halfway" herein refers to a state where the trigger switch 221 has been pressed to approximately an intermediate level between the initial position and the ON position. The set state detection unit 34 detects, when finding the trigger switch 221 pressed halfway between the initial position and the ON position, the state where the tool 2 is set in place on the work target. Alternatively, the set state detection unit 34 may set it as one of the conditions for detecting the state where the tool 2 is set in place on the work target that the trigger switch 221 have been pressed halfway between the initial position and the ON position.

Furthermore, the set state detection unit 34 according to this embodiment also detects, upon acquiring the stability information from the stability decision unit 33 (i.e., when a decision is made by the stability decision unit 33 that the captured image be stabilized), the state where the tool 2 is set in place on the work target. Alternatively, the set state detection unit 34 may set it as one of the conditions for detecting the state where the tool 2 is set in place on the work target that a decision be made by the stability decision unit 33 that the captured image be stabilized.

Upon detecting the state where the tool 2 is set in place on the work target, the set state detection unit 34 outputs set state detection information to the processing unit 35. On the other hand, unless the set state detection unit 34 detects the state where the tool 2 is set in place on the work target, the set state detection unit 34 outputs no set state detection information to the processing unit 35.

The set state detection unit 34 according to this embodiment detects the state where the tool 2 is set in place on the work target, when finding the tool's 2 current orientation to be the predetermined orientation, the distance difference equal to or less than the threshold distance, the value of the pressure applied to the rear surface of the grip 22 equal to or greater than the threshold pressure, the decision made by the stability decision unit 33 that the captured image be stabilized, and the trigger switch 221 pressed halfway. Note that the set state detection unit 34 according to this embodiment does not detect, when not finding the tool's 2 current orientation to be the predetermined orientation, the state where the tool 2 is set in place on the work target. Also, the set state detection unit 34 according to this embodiment does not detect, when finding the distance difference greater than the threshold distance, the state where the tool 2 is set in place on the work target. Furthermore, the set state detection unit 34 according to this embodiment does not detect, when finding the value of the pressure applied to the rear surface of the grip 22 less than the threshold pressure, the state where the tool 2 is set in place on the work target. Furthermore, the set state detection unit 34 according to this embodiment does not detect, unless the decision is made by the stability decision unit 33 that the captured image be stabilized, the state where the tool 2 is set in place on the work target. Furthermore, the set state detection unit 34 according to this embodiment does not detect, unless the trigger switch 221 has been pressed halfway, the state where the tool 2 is set in place on the work target.

The processing unit 35 according to this embodiment performs, upon receiving at least one of the stability information provided by the stability decision unit 33 or the set state detection information provided by the set state detection unit 34, predetermined processing based on the captured image. In other words, the processing unit 35 performs the identification processing based on the captured image when the work target is highly likely to be identified successfully. If the processing unit 35 started performing the identification processing too early, then not just would the work target fail to be identified but also would the identification processing fail to be started at the timing when the user is ready to start doing the work with the tool 2 held in his or her hands. This is because it takes a time of 0.5 seconds to 1.0 second to have the identification processing done by the processing unit 35. Unless the identification processing can be started at the timing when the user is ready to start doing the work with the tool 2 held in his or her hands, a significant delay would be caused when the identification processing is finished, thus possibly disturbing the user's work rhythm. In contrast, the processing unit 35 according to this embodiment may perform the identification processing when the work target is highly likely to be identified successfully, i.e., at the best timing when the user is ready to start doing the work with the tool 2 held in his or her hands, thus reducing the chances of causing a significant delay when the identification processing is finished. In addition, the identification processing may be performed based on a captured image on which an image capturing control such as automatic exposure (AE) or auto white balance (AWB) has been performed with stability by the image capturing unit 5, thus contributing to improving the accuracy of the identification processing. Note that if the processing unit 35 according to this embodiment has not received at least one of the stability information provided by the stability decision unit 33 or the set state detection information provided by the set state detection unit 34, then the processing unit 35 does not perform the predetermined processing based on the captured image.

The processing unit 35 intermittently performs, as the predetermined processing, the identification processing of identifying a current work target, on which the tool 2 is currently set in place, among the plurality of work targets. That is to say, the processing unit 35 has the function of identifying the current work target shot in the captured image. Specifically, the processing unit 35 performs image processing of comparing the captured image shot by the image capturing unit 5 with a plurality of reference images, thereby identifying the current work target shot in the captured image among the plurality of work targets. In this case, the plurality of reference images are stored in the storage unit 4 (image storage unit 41).

Specifically, the processing unit 35 performs, on the captured image, pattern recognition processing using, as template data, a plurality of reference images corresponding to the plurality of work targets, thereby identifying the current work target. That is to say, the processing unit 35 identifies the current work target shot in the captured image by comparing the capture image with the plurality of reference images corresponding to the plurality of work targets.

As used herein, the "pattern recognition processing" refers to image processing for recognizing, based on the shape of an object shot in an image, what the object shot in the image is. Examples of the pattern recognition processing of this type include pattern matching processing and processing of recognizing an object shot in an image by using a learned model created by machine learning. The pattern matching processing as used herein refers to the processing of using the template data described above to compare the template data with a target (such as the captured image). Also, any appropriate algorithm may be used in the method for machine learning. For example, a deep learning algorithm may be adopted.

Furthermore, if the work target thus identified does not conform to a working instruction defined by the working procedure, then the processing unit 35 performs at least one of placing a restriction on the operation of the driving unit 24 or making notification. In other words, the processing unit 35 determines whether or not the work target identified by the processing unit 35 (i.e., the current work target) conforms to a working instruction defined by the preset working procedure. That is to say, the processing unit 35 determines whether or not the work target identified by the processing unit 35 agrees with the work target specified by the working instruction included in the working procedure.

Specifically, the processing unit 35 extracts data of a working procedure associated with the current work target from a procedure storage unit 44 of the storage unit 4. Then, the processing unit 35 determines whether or not the work target, subjected to the current working instruction defined by the working procedure that has been extracted from the procedure storage unit 44, agrees with the work target identified. If these work targets agree with each other, the processing unit 35 decides that the work target identified should conform to the working instruction defined by the working procedure. On the other hand, if these work targets disagree with each other, the processing unit 35 decides that the work target identified should not conform to the working instruction defined by the working procedure.

When deciding, as a result of such determination, that the work target thus identified should not conform to the working instruction defined by the working procedure, the processing unit 35 performs at least one of placing a restriction on the operation of the driving unit 24 or making notification. As used herein, the "notification" refers to not only that the user is notified directly by the notification unit 211 of the tool system 1 but also that the user is notified indirectly via an external terminal (such as a mobile communications device), for example.

Specifically, when deciding that the work target thus identified should not conform to the working instruction defined by the working procedure, the processing unit 35 does not allow the driving unit 24 to be activated even if the trigger switch 221 is pulled. That is to say, the driving unit 24 is allowed to be activated only when the processing unit 35 decides that the work target thus identified should conform to the working instruction defined by the working procedure. Thus, even if the tool 2 is currently set in place on a work target that does not conform to the working procedure, the driving unit 24 remains deactivated, thus prohibiting fastening work from being performed. This may reduce the chances of the work being performed in a wrong working procedure. Optionally, when deciding that the work target thus identified should not conform to the working instruction defined by the working procedure, the processing unit 35 may lock the trigger switch 221 to prevent the user from pulling the trigger switch 221 in such a situation.

In addition, when deciding that the work target thus identified should not conform to the working instruction defined by the working procedure, the processing unit 35 makes the notification control unit 36 activate the notification unit 211. Thus, the notification unit 211 serves as a user notification unit for notifying the user that the tool 2 is now set in place on a work target that does not conform to the working procedure.

That is to say, the processing unit 35 performs, on receiving at least one of the stability information provided by the stability decision unit 33 and the set state detection information provided by the set state detection unit 34, as predetermined processing, at least identification processing of identifying the current work target. In addition, the processing unit 35 further performs, as predetermined processing, procedure determination processing of comparing the work target thus identified with the working instruction defined by the working procedure and thereby determining their correspondence. If the result of the procedure determination processing reveals that the work target does not conform to the working instruction, then the processing unit 35 places a restriction on the operation of the driving unit 24 and/or makes notification.

The registration unit 38 performs, if the operation mode of the tool 2 is the registration mode, image registration processing of storing the plurality of reference images in the image storage unit 41 of the storage unit 4 and torque registration processing of storing a plurality of target torque values in the torque storage unit 42 of the storage unit 4.

In addition, the registration unit 38 makes, while performing the image registration processing, the image storage unit 41 store, as the reference image, a still picture generated by having the work target shot by the image capturing unit 5, for example. Specifically, if the operation mode of the tool 2' is the registration mode, then the trigger switch 221 also serves as a shutter release button. When the trigger switch 221 turns ON (i.e., has been pressed to the ON position), the image capturing unit 5 generates a still picture. The registration unit 38 makes the image storage unit 41 store this still picture as a reference image.

The storage unit 4 may be implemented as a semiconductor memory, for example, and performs the function of the image storage unit 41, the torque storage unit 42 (target value storage unit), the result storage unit 43, and the procedure storage unit 44. In this embodiment, the image storage unit 41, the torque storage unit 42, the result storage unit 43, and the procedure storage unit 44 are implemented as a single memory. However, this is only an example and should not be construed as limiting. Alternatively, these storage units 41, 42, 43, and 44 may also be implemented as a plurality of memories. Still alternatively, the storage unit 4 may also be implemented as a storage medium such as a memory card attachable to, and removable from, the tool 2.

The image storage unit 41 stores the plurality of reference images in association with the plurality of work targets.

The torque storage unit 42 stores a plurality of target torque values (target values) in association with the plurality of work targets one to one. As used herein, the "target torque value" refers to the target value of fastening torque when a fastening member is attached to an associated work target.

The result storage unit 43 stores the decision results obtained by the torque decision unit 37 with respect to a plurality of portions to be fastened in association with the plurality of work targets. It is recommended that the result storage unit 43 store the decision results obtained by the torque decision unit 37 with time stamps, indicating the working times, added thereto. This allows the work target decision results to be distinguished from one workpiece to another on the assembly line.

The procedure storage unit 44 stores data about either a single working procedure or a plurality of working procedures. As described above, the working procedure means the procedure in which work is supposed to be performed using the tool 2 and may be, for example, data defining in which order the work should be performed on a plurality of work targets of a single workpiece.

(3) Operation

Next, an exemplary operation of the tool system 1 according to this embodiment will be described with reference to FIGS. 3-6.

In the following example, it will be described how the tool system 1 operates when the user performs the work of assembling a plurality of workpieces A1 on an assembly line. Each workpiece A1 is supposed to have two work targets (hereinafter referred to as "first and second work targets," respectively) and the user is supposed to perform the work of attaching a fastening member onto each of these work targets using the tool 2.

(3.1) Registration Mode

First, an exemplary operation of the tool system 1 in the registration mode will be described with reference to FIG. 3. In this case, the tool 2 is supposed to be in an initial state in which both the image registration processing and the torque registration processing are yet to be performed by the registration unit 38. That is to say, in the tool 2 in the initial state, none of the first and second reference images and first and second target torque values corresponding to the first and second work targets, respectively, are stored in the image storage unit 41 or the torque storage unit 42 yet.

The user sets the operation mode of the tool 2 as registration mode (in S1). Next, the user operates the operating panel 231 to enter the torque value of the fastening torque when the fastening member is attached to the first work target (in S2). The driving control unit 31 sets the entered torque value as a torque setting for the first work target. Then, the user performs the fastening work of attaching the fastening member onto the first work target by pulling the trigger switch 221 (in S3). At this time, the first work target is shot, thus generating a still image of the first work target.

When the fastening work is done, the registration unit 38 performs registration processing (including image registration processing and torque registration processing) (in S4). Specifically, the registration unit 38 performs the image registration processing of making the image storage unit 41 store, as a first reference image corresponding to the first work target, a still picture of the first work target generated during the fastening work in Step S3. In addition, the registration unit 38 also performs the torque registration processing of making the torque storage unit 42 store, as a first target torque value associated with the first work target, a torque setting when the fastening . . . member is attached to the first work target during the fastening work in Step S3. That is to say, the first target torque value is associated with the first reference image.

In particular, according to this embodiment, the processing unit 35 performs the procedure determination processing. Thus, in the registration processing, the target torque value is registered to be included in the working instruction. In other words, in the registration processing, the working procedure is registered. In this example, the registration unit 38 registers the working procedure such that the working instruction instructing the work to be done on the first work target becomes the first working instruction in the working procedure. Specifically, the registration unit 38 registers, as the working process step to be performed "in the first place" according to the working procedure, a working instruction which instructs the work to be done on the first work target and which includes the first target torque value.

The torque decision unit 37 performs result storage processing of making the result storage unit 43 store, in association with the first work target, a first decision result indicating whether or not the fastening torque when the fastening member is attached to the first work target is a normal one (in S5).

In addition, the user also performs fastening work on the second work target following the same working procedure as the first work target. Specifically, the user operates the operating panel 231 to enter a torque value of fastening torque when a fastening member is attached to the second work target (in S6) and then performs the fastening work of attaching the fastening member to the second work target (in S7). At this time, a still picture of the second work target is generated and the registration unit 38 performs the registration processing (including the image registration processing and the torque registration processing) (in S8). The registration unit 38 registers, as a working process step to be performed "in the second place" according to the working procedure, a working instruction which instructs the work to be done on the second work target and which includes a second target torque value. The torque decision unit 37 performs result storage processing of making the result storage unit 43 store a second decision result indicating whether or not the fastening torque during the fastening work in Step S7 is a normal one (in S9).

When the registration processing is done on every work target of the workpiece A1, the user operates the operating panel 231 to switch the operation mode of the tool 2 from the registration mode to the working mode (in S10). Switching the operation mode of the tool 2 from the registration mode to the working mode ends the registration mode.

Figure 3:
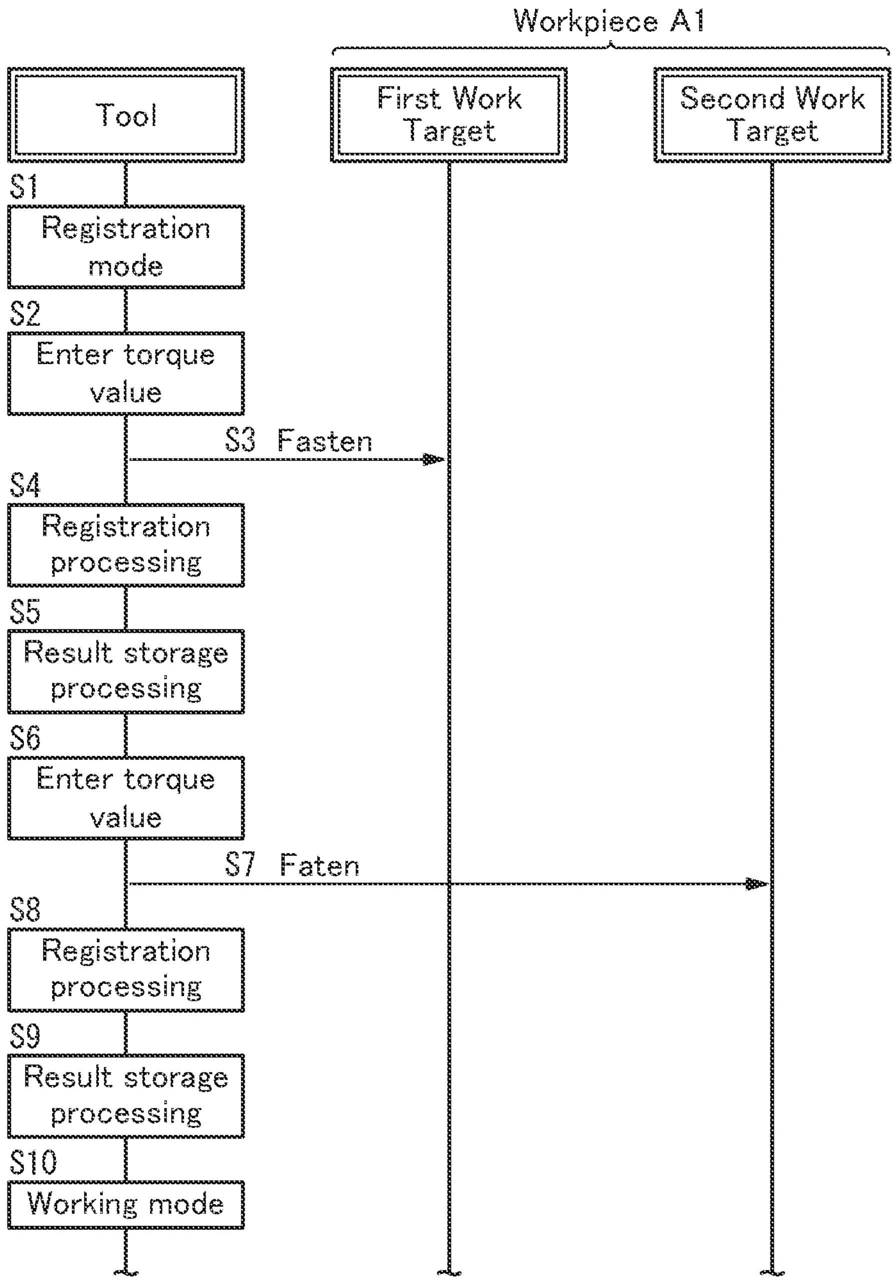
FIG. 3 shows the sequence of operations to be performed by the tool system.

Note that the sequence shown in FIG. 3 is only an example. Thus, the processing steps shown in FIG. 3 may be performed in a different order as appropriate, an additional processing step may be performed as needed, or at least one of the processing steps may be omitted as appropriate.

(3.2) Working Mode

Next, an exemplary operation of the tool system 1 in the working mode will be described with reference to FIGS. 4-6.

Figure 4:
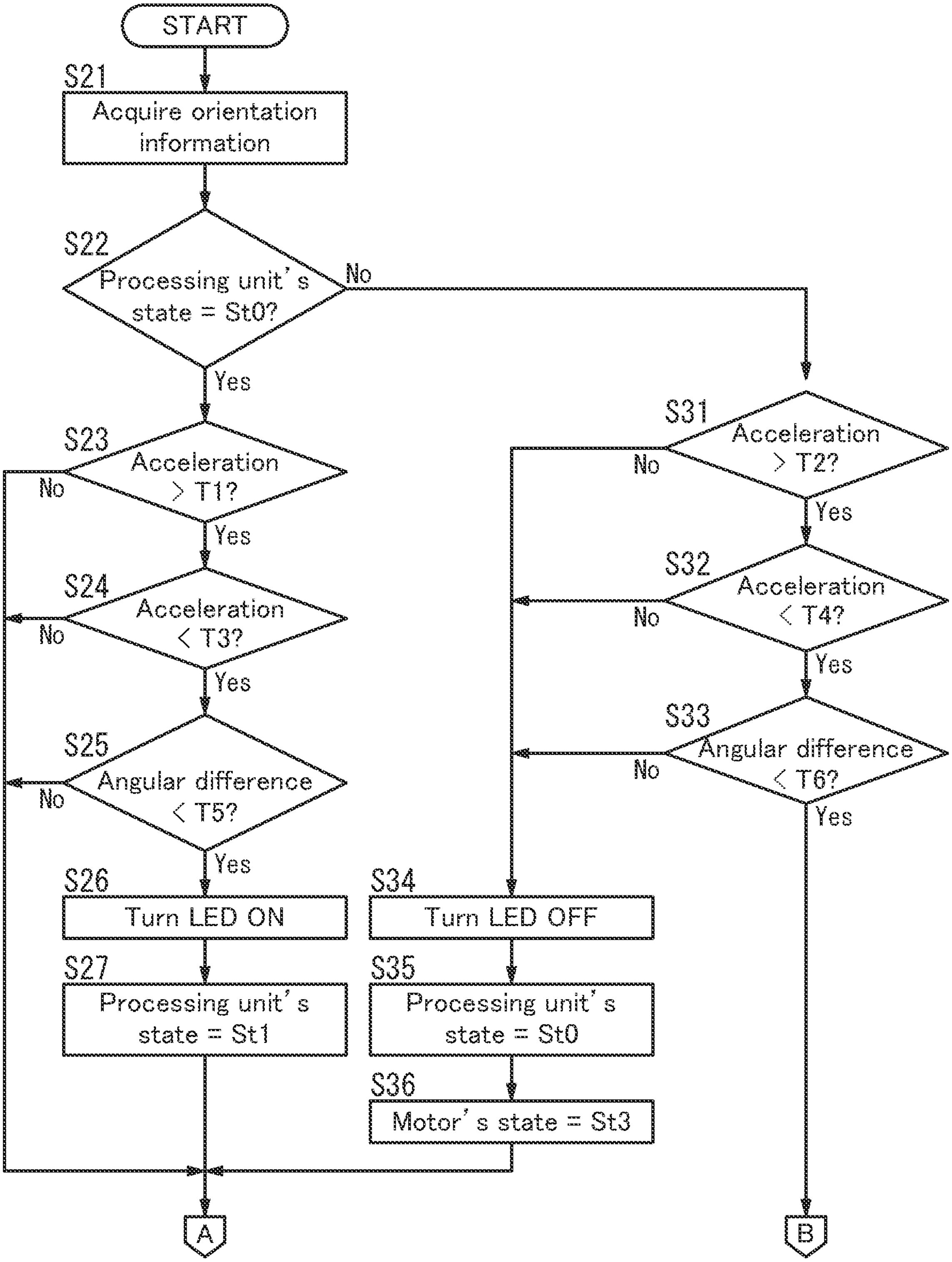
FIG. 4 is a flowchart showing an exemplary procedure of operations to be performed by the tool system.
Figure 5:
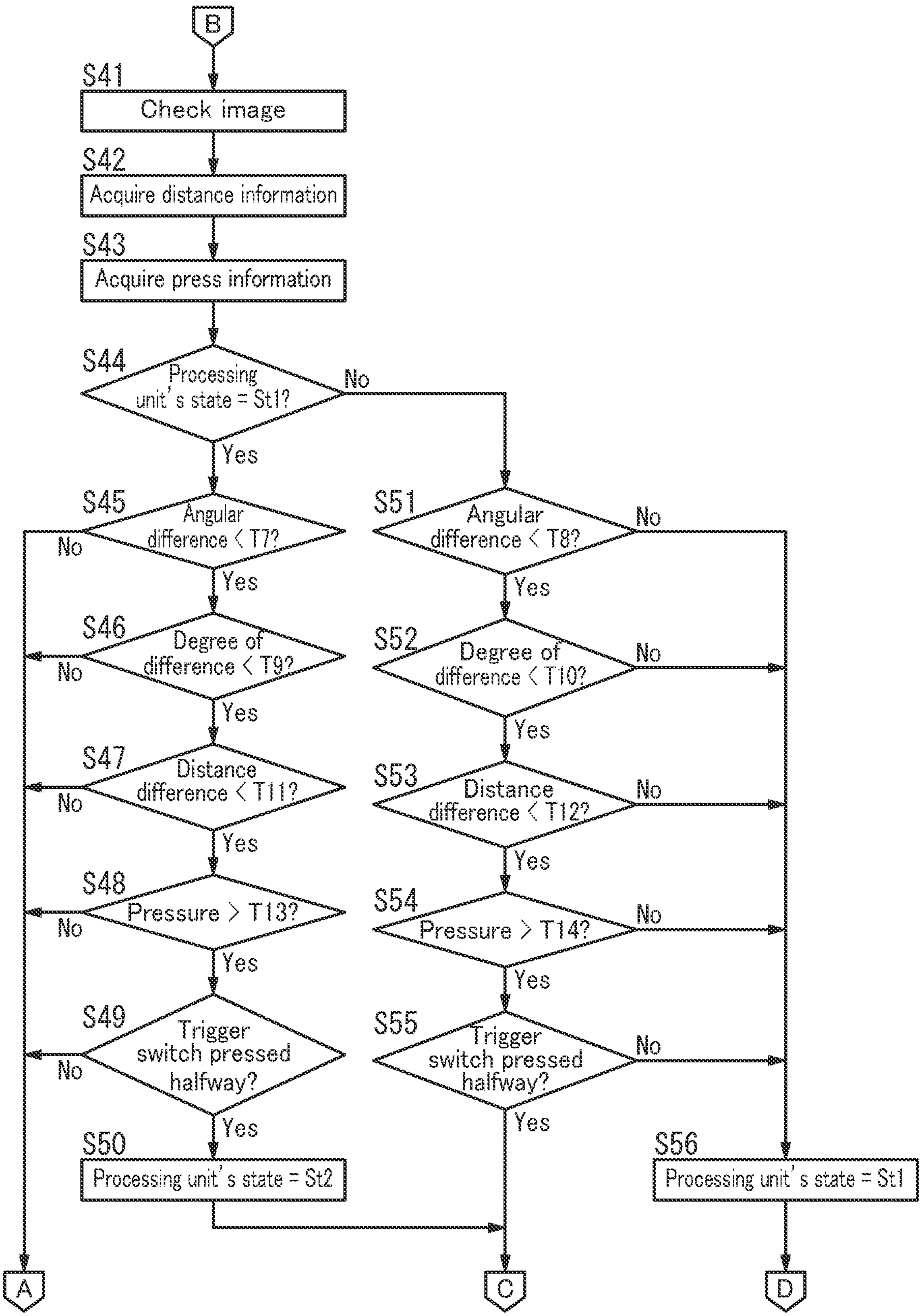
FIG. 5 is a flowchart showing the exemplary procedure of operations to be performed by the tool system.
Figure 6:
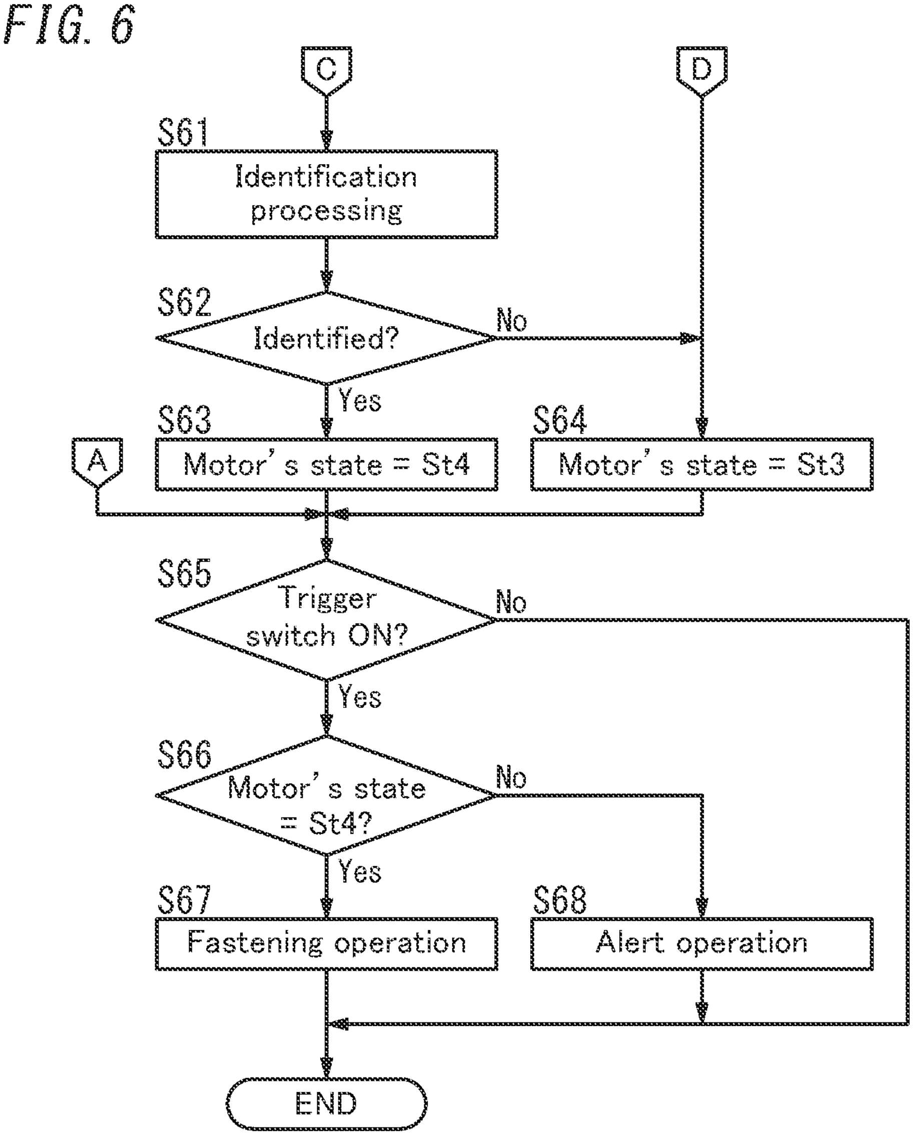
FIG. 6 is a flowchart showing the exemplary procedure of operations to be performed by the tool system.

The processing shown in FIGS. 4-6 is performed by the tool system 1 every time a frame of the captured image shot by the image capturing unit 5 is refreshed. When a frame of the captured image is refreshed, the set state detection unit 34 acquires the orientation information from the orientation detection unit 26 (in S21). Next, the set state detection unit 34 sees if the (operating) state of the processing unit 35 is state St0 (in S22). As used herein, the "state St0" refers to an idle state of the processing unit 35 in which the identification processing is not started. On the other hand, a state, "St1" as used herein refers to a standby state of the processing unit 35 in which the identification processing has not been started yet but may be started. Furthermore, a state "St2" as used herein refers to a state where the processing unit 35 is performing the identification processing.

If the state of the processing unit 35 is the state St0 (if the answer is YES in S22), the set state detection unit 34 compares the acceleration of the tool 2 with an acceleration threshold value T1 based on the orientation information (in S23). In this case, the acceleration threshold value T1 according to this embodiment is approximately equal to zero. That is to say, the set state detection unit 34 sees if the tool 2 is moving at least slightly. In other words, the set state detection unit 34 sees if the tool 2 is not put on a desk or a floor, for example. It is apparent that the state where the tool 2 is put on a desk or a floor is different from the state where the tool 2 is set in place on the work target. When finding the acceleration of the tool 2 greater than the threshold value T1 (if the answer is YES in S23), the set state detection unit 34 compares the acceleration of the tool 2 with another acceleration threshold value T3 based on the orientation information (in S24). In this case, the acceleration threshold value T3 according to this embodiment is a value larger than T1 and is set at a value close to the acceleration of the tool 2 in a situation where the user is moving while carrying the tool 2 with him or her (i.e., in a situation where the user is shaking the tool 2). It is apparent that the state where the user is moving while carrying the tool 2 with him or her or the state where the user is shaking the tool 2 is not the state where the tool 2 is set in place on the work target.

When finding the acceleration of the tool 2 less than the threshold value T3 (if the answer is YES in S24), the set state detection unit 34 compares the angular difference between the tool's 2 current orientation and the reference orientation with an angular difference threshold value T5 based on the orientation information (in S25). In this embodiment, the angular difference threshold value T5 may be, for example, 10 degrees. If the angular difference between the tool's 2 current orientation and the reference orientation less than the threshold value T5 (if the answer is YES in S25), the LED of the light-emitting unit 234 for shooting turns ON (in S26). Then, the state of the processing unit 35 turns into the state St1, i.e., the standby state (in S27). In that case, the process proceeds to the processing step S65 shown in FIG. 6. Note that if the acceleration of the tool 2 is equal to or less than the threshold value T1 (if the answer is NO in S23), if the acceleration of the tool 2 is equal to or greater than the threshold value T3 (if the answer is NO in S24), or if the angular difference between the tool's 2 current orientation and the reference orientation is equal to or greater than the threshold value T5 (if the answer is NO in S25), then the process proceeds to the processing step S65 shown in FIG. 6.

On the other hand, if it turns out in Step S22 that the state of the processing unit 35 is not the state St0 but is either the state St1 or the state St2 (i.e., if the answer is NO in S22), the set state detection unit 34 compares the acceleration of the tool 2 with an acceleration threshold value T2 based on the orientation information (in S31). When finding the acceleration of the tool 2 greater than the threshold value 12 if the answer is YES in S31), the set state detection unit 34 compares the acceleration of the tool 2 with another acceleration threshold value T4 based on the orientation information (in S32). When finding the acceleration of the tool 2 less than the threshold value T4 (if the answer is YES in S32), the set state detection unit 34 compares the angular difference between the tool's 2 current orientation and the reference orientation with an angular difference threshold value T6 based on the orientation information (in S33). If the angular difference between the tool's 2 current orientation and the reference orientation is less than the angular difference threshold value T6 (if the answer is YES in S33), the process proceeds to the processing step S41 shown in FIG. 5. Note that if the acceleration of the tool 2 is equal to or less than the threshold value T2 (if the answer is NO in S31), if the acceleration of the tool 2 is equal to or greater than the threshold value T4 (if the answer is NO in S32), or if the angular difference between the tool's 2 current orientation and the reference orientation is equal to or greater than the threshold value T6 (if the answer is NO in S33), then the process proceeds to the processing step S34.

In this case, if the state of the processing unit 35 is either the state St1 or the state St2, then the LED of the light-emitting unit 234 for shooting is in ON state. When the LED in ON state turns OFF (in S34), the state of the processing unit 35 turns into the state St0, i.e., the idle state (in S35). Then, the state of the motor included in the driving unit 24 turns into the state St3 (in S36). As used herein, the "state St3" refers to a state where the motor of the driving unit 24 is prohibited from running even if the trigger switch 221 is pulled by the user. After the state of the motor has turned into the state St3, the process proceeds to the processing step S65 shown in FIG. 6.

Note that the acceleration threshold values T1, T2 according to this embodiment are each set to have hysteresis and the threshold value T2 is smaller than the threshold value T1. In the same way, the acceleration threshold values T3, T4 are also each set to have hysteresis and the threshold value T4 is larger than the threshold value T3. Likewise, the angular difference threshold values T5, T6 are also each set to have hysteresis and the threshold value T6 is larger than the threshold value T5.

Next, the processing steps S41-S56 will be described with reference to FIG. 5. The stability decision unit 33 checks the latest frame (first frame) of the captured image (in S41). Meanwhile, the set state detection unit 34 acquires the distance information from the distance measuring unit 27 (in S42) and acquires the press information from the press detection unit 28 (in S43). Next, the set state detection unit 34 sees if the state of the processing unit 35 is state St1 (in S44). If the state of the processing unit 35 is the state St1 (if the answer is YES in S44), the set state detection unit 34 compares the angular difference between the tool's 2 current orientation and the reference orientation with an angular difference threshold value T7 based on the orientation information (in S45). In this case, the angular difference threshold value T7 according to this embodiment may be 5 degrees, for example. When finding the angular difference between the tool's 2 current orientation and the reference orientation less than the angular difference threshold value T7 (if the answer is YES in S45), the stability decision unit 33 calculates the degree of difference between the latest frame of the captured image and the previous frame (second frame) preceding the latest frame. Then, the stability decision unit 33 compares the degree of difference calculated by itself with a degree of difference threshold value T9 (in S46). When finding the degree of difference calculated by itself less than the threshold value T9 (if the answer is YES in S46), the stability decision unit 33 outputs stability information to the set state detection unit 34 and the processing unit 35. Next, the set state detection unit 34 calculates a distance difference based on the distance information and compares the distance difference with a threshold distance T11 (in S47). When finding the distance difference less than the threshold distance T11 (if the answer is YES in S47), the set state detection unit 34 compares the pressure applied to the rear surface of the grip 22 with a threshold pressure T13 based on the press information (in S48). When finding the pressure applied to the rear surface of the grip 22 greater than the threshold pressure T13 (if the answer is YES in S48), the set state detection unit 34 sees if the trigger switch 221 has been pressed halfway (in S49). When finding the trigger switch 221 pressed halfway (if the answer is YES in S49), the set state detection unit 34 outputs set state detection information to the processing unit 35. Then, the state of the processing unit 35 turns into the state St2 (i.e., the state where the processing unit 35 is performing the identification processing) (in S50) and the process proceeds to the processing step S61 shown in FIG. 6.

Note that if the angular difference is equal to or greater than the threshold value T7 (if the answer is NO in S45), if the degree of difference is equal to or greater than the threshold value T9 (if the answer is NO in S46), if the distance difference is equal to or greater than the threshold distance T11 (if the answer is NO in S47), if the pressure applied is equal to or less than the threshold pressure T13 (if the answer is NO in S48), or if the trigger switch 221 has not been pressed halfway (if the answer is NO in S49), then the process proceeds to the processing step S65 shown in FIG. 6.

When finding, in S44, the state of the processing unit 35 not the state St1 but the state St2 (if the answer is NO in S44), the set state detection unit 34 compares the angular difference between the tool's 2 current orientation and the reference orientation with an angular difference threshold value T8 based on the orientation information (in S51). When finding the angular difference between the tool's 2 current orientation and the reference orientation less than the threshold value T8 (if the answer is YES in S51), the stability decision unit 33 calculates the degree of difference between the first frame and the second frame. Then, the stability decision unit 33 compares the degree of difference calculated by itself with a degree of difference threshold value T10 (in S52). When finding the degree of difference calculated by itself less than the threshold value T10 (if the answer is YES in S52), the stability decision unit 33 outputs stability information to the set state detection unit 34 and the processing unit 35. Next, the set state detection unit 34 calculates a distance difference based on the distance information and compares the distance difference with a threshold distance T12 (in S53). When finding the distance difference less than the threshold distance T12 (if the answer is YES in S53), the set state detection unit 34 compares the pressure applied to the rear surface of the grip 22 with a threshold pressure T14 based on the press information (in S54). When finding the pressure applied to the rear surface of the grip 22 greater than the threshold pressure T14 (if the answer is YES in S54), the set state detection unit 34 sees if the trigger switch 221 has been pressed halfway (in S55). When finding the trigger switch 221 pressed halfway (if the answer is YES in S55), the set state detection unit 34 outputs set state detection information to the processing unit 35. Then, the process proceeds to the processing step S61 shown in FIG. 6.

Note that if the angular difference is equal to or greater than the threshold value T8 (if the answer is NO in S51), if the degree of difference is equal to or greater than the threshold value T10 (if the answer is NO in S52), if the distance difference is equal to or greater than the threshold distance T12 (if the answer is NO in S53), if the pressure applied is equal to or less than the threshold pressure T14 (if the answer is NO in S54), or if the trigger switch 221 has not been pressed halfway (if the answer is NO in S55), then the state of the processing unit 35 turns from the state St2 into the state St1 (in S56) and the process proceeds to the processing step S64 shown in FIG. 6.

Note that the angular difference threshold values T7, T8 according to this embodiment are each set to have hysteresis and the threshold value T8 is larger than the threshold value T7. In the same way, the degree of difference threshold values T9, T10 are also each set to have hysteresis and the threshold value T10 is larger than the threshold value T9. Likewise, the threshold distances T11, T12 are also each set to have hysteresis and the threshold distance T12 is larger than the threshold distance T11. Likewise, the threshold pressures T13, T14 are also each set to have hysteresis and the threshold pressure T14 is smaller than the threshold pressure T13.

Next, the processing steps S61-S68 will be described with reference to FIG. 6. Upon receiving at least one of the stability information provided by the stability decision unit 33 or the set state detection information provided by the set state detection unit 34, the processing unit 35 performs the identification processing based on the captured image (in S61). Then, the processing unit 35 sees if the current work target has been identified successfully and whether the work target thus identified follows the working procedure (in S62). If the processing unit 35 has identified the current work target successfully and the work target thus identified follows the working procedure (if the answer is YES in S62), then the state of the motor turns into a state St4 (in S63). As used herein, the "state St4" refers to a state where the motor included in the driving unit 24 starts running in response to the trigger switch 221 being turned ON by being pulled by the user. After the state of the motor has turned into the state St4, the process proceeds to the processing step S65.

On the other hand, if the processing unit 35 has failed to identify the current work target in S62 or unless the work target identified follows the working procedure (if the answer is NO in S62), the state of the motor turns into a state St3 (in S64). After the state of the motor has turned into the state St3, the process proceeds to the processing step S65.

Next, the processing unit 35 sees if the trigger switch 221 has been pulled by the user (in S65). If the trigger switch 221 has been pulled by the user to turn the trigger switch 221 ON (if the answer is YES in S65), the processing unit 35 sees if the state of the motor is the state St4 (in S66). If the state of the motor is the state St4 (if the answer is YES in S66), the processing unit 35 allows a fastening operation to be performed by running the motor included in the driving unit 24. As a result, the fastening operation is performed by running the motor (in S67). In this processing step, the driving control unit 31 of the tool 2 controls the driving unit 24 such that the target torque value associated with the work target identified becomes the torque setting. When the fastening operation is finished, the processing ends.

On the other hand, if it turns in Step S66 that the state of the motor is not the state St4 but the state St3 (if the answer is NO in S66), then the processing unit 35 performs an alert operation such as lighting the notification unit 211 in red (in S68). Note that the motor included in the driving unit 24 does not run in that case.

Note that the flowchart shown in FIGS. 4-6 is only an example. Thus, the processing steps shown in FIGS. 4-6 may be performed in a different order as appropriate, an additional processing step may be performed as needed, or at least one of the processing steps may be omitted as appropriate.

(4) Variations

Note that the exemplary embodiment described above is only an exemplary one of various embodiments of the present disclosure and should not be construed as limiting. Rather, the exemplary embodiment may be readily modified in various manners depending on a design choice or any other factor without departing from the scope of the present disclosure. The drawings to be referred to in this description are all schematic representations. Thus, the ratio of the dimensions (including thicknesses) of respective constituent elements illustrated on the drawings does not always reflect their actual dimensional ratio.

Also, according to the present disclosure, when various parameters are compared with their respective threshold values, it is arbitrarily changeable, depending on selection of the threshold value, for example, whether or not the phrase "greater than" covers the situation where the two values are equal to each other. Therefore, from a technical point of view, there is no difference between the phrase "greater than" and the phrase "equal to or greater than." Similarly, according to the present disclosure, when various parameters are compared with their respective threshold values, there is no difference, from a technical point of view, between the phrase "equal to or less than" and the phrase "less than" as well.

Also, the functions of the tool system 1 according to the exemplary embodiment may also be implemented as a work target identification method, a (computer) program, or a non-transitory storage medium that stores the program thereon. A work target identification method according to an aspect includes an identification processing step, a stability decision step, and a set state detection step. The identification processing step includes identifying a work target based on a captured image generated by an image capturing unit 5. The image capturing unit 5 is provided for a portable tool 2 including a driving unit 24 to be activated with power supplied from a power source. The stability decision step includes determining whether the captured image is stabilized or not. The set state detection step includes detecting a state where the tool 2 is set in place on the work target. Note that the work target identification method only needs to include at least the identification processing step and the set state detection step. A program according to another aspect is designed to cause one or more processors to perform the work target identification method described above.

Next, variations of the exemplary embodiment will be enumerated one after another. Note that the variations to be described below may be adopted as appropriate in combination.

The tool system 1 may measure, based on the image captured by the image capturing unit 5 implemented as a stereoscopic camera, the distance between the image capturing unit 5 and the work target. Then, the set state detection unit 34 may detect, when finding the absolute value of the difference calculated by subtracting the distance between the image capturing unit 5 and the work target from the reference distance equal to or less than the threshold value, the state where the tool 2 is set in place on the work target.

Optionally, while the processing unit 35 is performing the identification processing, at least one of the captured image or the reference image may be subjected, in accordance with the orientation information, to spin compensation and/or distortion correction. As used herein, the "distortion correction" means making correction to the captured image by partially expanding or shrinking the captured image (or reference image) to an arbitrary degree. For example, the processing unit 35 may obtain a captured image in which a rectangular subject is shot in a rectangular shape by subjecting a captured image in which the rectangular subject is shot in a trapezoidal shape to the distortion correction.

The "predetermined orientation" may be an orientation of the tool 2 in a situation where the angular difference between the rotational angle of the tool 2 around any one of the three axes, determining its current orientation detected by the orientation detection unit 26, and the corresponding one of the rotational angles defining its reference orientation is equal to or less than a threshold value.

The set state detection unit 34 may be configured to detect, instead of the orientation detection unit 26, the motion and orientation of the tool 2 based on the output of the motion sensor 261. That is to say, the set state detection unit 34 may perform the function of the orientation detection unit 26.

The set state detection unit 34 may be configured to detect, instead of the distance measuring unit 27, the distance between the work target (or the workpiece) and the tool 2 based on the output of the distance sensor 271. That is to say, the set state detection unit 34 may perform the function of the distance measuring unit 27.

The set state detection unit 34 may be configured to sense, based on the output of the pressure sensor 281, the tool 2 be pressed against the work target instead of the press detection unit 28. That is to say, the set state detection unit 34 may perform the function of the press detection unit 28.

In the image registration processing in the registration mode, the tool's 2 orientation detected by the orientation detection unit 26 (i.e., orientation information) may also be stored in the (image storage unit 41 of the) storage unit 4 in association with the reference image generated by the image capturing unit 5. This allows the reference image and the tool's 2 orientation to be registered in association with each other. Thus, once the captured image and the tool's 2 orientation have been identified in the working mode, the processing unit 35 may compare the captured image with a reference image associated with that orientation. Alternatively, the tool's 2 orientation associated with the reference image may be defined as the reference orientation.

Also, in the image registration processing in the registration mode, the distance detected by the distance measuring unit 27 between the tool 2 and the work target (distance information) may be defined to be a reference distance and stored in the (image storage unit 41 of the) storage unit 4 in association with the reference image generated by the image capturing unit 5. Furthermore, in the image registration processing in the registration mode, the pressure detected by the press detection unit 28 as being applied to the grip 22 (press information) may also be stored in the (image storage unit 41 of the) storage unit 4 in association with the reference image generated by the image capturing unit 5.

The stability decision unit 33 may calculate the degree of matching (resemblance) between the first and second frames to determine whether the captured image is stabilized or not. The stability decision unit 33 may calculate the degree of matching between the first and second frames by normalized cross-correlation (NCC), for example.

Optionally, the stability decision unit 33 may also calculate, while performing the stability decision processing, the degree of difference by comparing the luminance value of a particular area in the first frame with a luminance value as a moving average of the corresponding particular area in the second frame and one or more previous frames preceding the second frame. In that case, the processing load on the stability decision unit 33 increases in terms of the stability decision processing but the accuracy of the stability decision processing improves, which is an advantage.

Optionally, the stability decision unit 33 may perform the stability decision processing by performing, on the first frame, pattern recognition processing using other frames, including the second frame, as template data.

The tool system 1 according to the present disclosure includes a computer system in the control unit 3*a*, 3*b* thereof, for example. The computer system may include, as principal hardware components, a processor and a memory. The functions of the tool system 1 according to the present disclosure may be performed by making the processor execute a program stored in the memory of the computer system. The program may be stored in advance in the memory of the computer system. #Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an ESI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, at least some functions of the tool system 1 are integrated together in a single housing (body 20). However, this is not an essential configuration for the tool system 1. Alternatively, those constituent elements of the tool system 1 may be distributed in multiple different housings.

For example, some functions of the control unit 3*a*, 3*b* may be provided in a housing provided separately from the body 20 of the tool 2. Still alternatively, at least some functions of the control unit 3*a*, 3*b* or any other processor may be implemented as, for example, a server or a cloud computing system as well.

Furthermore, in the embodiment described above, the image storage unit 41 of the tool 2 stores a plurality of reference images respectively corresponding to a plurality of work targets. However, the tool 2 does not have to store such a plurality of reference images respectively corresponding to a plurality of work targets. Alternatively, either a setting terminal 60 or the server device may include an image storage unit that stores such a plurality of reference images respectively corresponding to a plurality of work targets. In that case, the processing unit 35 of the tool 2 may access the image storage unit of the setting terminal 60 or the server device to perform the processing of comparing the first captured image shot by the image capturing unit 5 with the reference image stored in the image storage unit and thereby identifying the current work target. Furthermore, the tool 2 does not have to include the processing unit 35, either. Alternatively, either the setting terminal 60 or the server device may perform the function of the processing unit 35. When the tool 2 outputs a first captured image shot by the image capturing unit 5 to either the setting terminal 60 or the server device, the processing unit of the setting terminal 60 or the server device performs image processing of comparing the first captured image with the reference image and output the result of identification of the current work target to the tool 2.

Furthermore, the image capturing unit 5 does not have to be provided for the barrel 21 of the body 20 but may be provided for the attachment 23 of the body 20 or the battery pack 201, for example. Likewise, the arrangement of the control unit 3*a*, 3*b*, the storage unit 4, and other units may also be changed as appropriate. Also, the tool 2 may include the image capturing unit 5.

Figure 7:
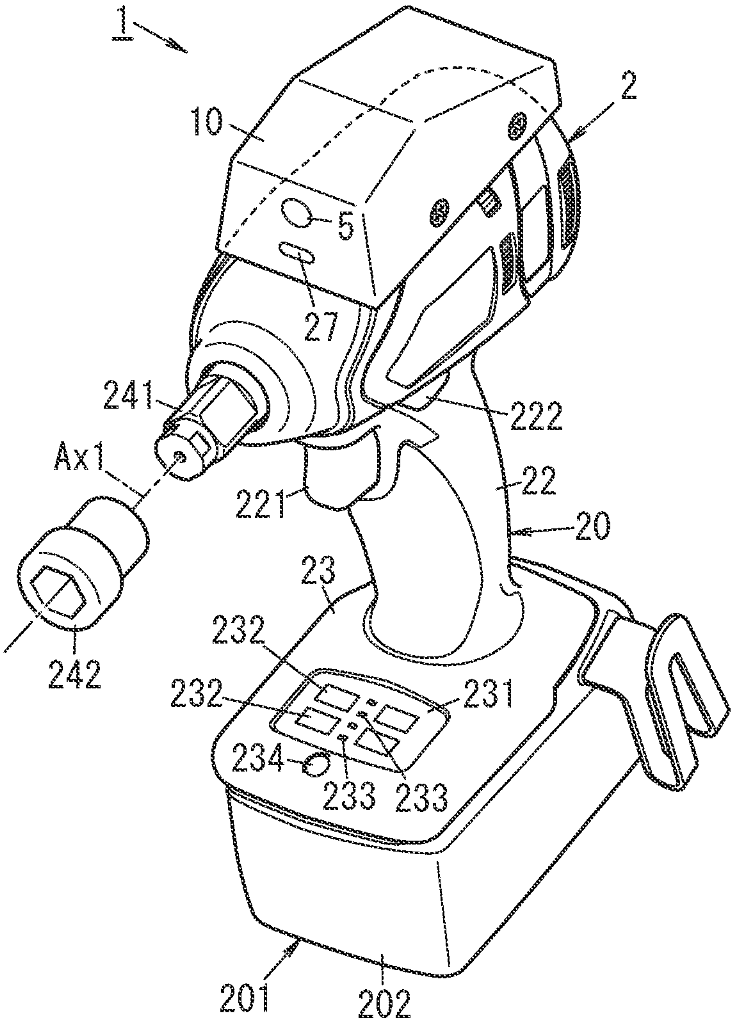
FIG. 7 is a perspective view illustrating the appearance of a tool system according to a variation.

Optionally, the work target identification system 10 may be attached as an external device to the tool 2 as shown in FIG. 7. In that case, the control unit 3*a* of the tool 2 and the control unit 3*b* of the work target identification system 10 may either be electrically connected to each other directly or communicate with each other via communications units. In the latter case, the communications units may adopt a wireless communications protocol compliant with a standard such as Wi-Fi®, Bluetooth®, ZigBee®, or a low power radio standard requiring no licenses (e.g., the Specified Low Power Radio standard). Also, the work target identification system 10 may include a power source different from the battery pack 201 and the power source different from the battery pack 201 may be used as a power source for the image capturing unit 5 and the control unit 3*b*, for example. Such a work target identification system 10 may determine whether or not the captured image is stabilized and identify the work target based on the stabilized captured image. In addition, the work target identification system 10 may detect the state where the work target is set in place on the work target and then identify the work target based on the captured image. This enables reducing the number of times the work target identification system 10 performs the identification processing in vain, thus cutting down the power consumption. In the example illustrated in FIG. 7, the work target identification system 10 including the built-in image capturing unit 5 is attached as an auxiliary device to the tool 2. That is to say, the image capturing unit 5 of the work target identification system 10 is provided as an external device for the tool 2.

The work target identification system 10 only needs to include at least the set state detection unit 34 and the processing unit 35. Also, in the exemplary embodiment described above, the work target identification system 10 is implemented as a single system including the set state detection unit 34 and the processing unit 35. Alternatively, the work target identification system 10 may also be implemented as two or more systems. For example, the functions of the set state detection unit 34 and the processing unit 35 may be distributed in two or more systems. Also, at least one function of the set state detection unit 34 or the processing unit 35 may be distributed in two or more systems. For example, the function of the set state detection unit 34 may be distributed in two or more devices. Optionally, at least some functions of the work target identification system 10 may be implemented as a cloud computing system as well.

When deciding that the captured image be stabilized, the stability decision unit 33 may output the stability information to only the set state detection unit 34.

Even if the processing unit 35 has not received the stability information provided by the stability decision unit 33, the processing unit 35 may perform the predetermined processing including the identification processing, as long as the processing unit 35 has received at least the set state detection information provided by the set state detection unit 34.

Note that the tool system 1 does not have to be applied to the assembly line, on which workpieces are assembled at a factory, but may find any other application as well.

In the embodiment described above, the tool 2 is an impact wrench. However, the tool 2 does not have to be an impact wrench but may also be a nut runner or an oil pulse wrench, for example. Alternatively, the tool 2 may also be a screwdriver (including an impact screwdriver) for use to fasten screws (as fastening members), for example. In that case, a bit (such as a screwdriver bit) is attached to the tool 2 instead of the socket 242. Furthermore, the tool 2 does not have to be configured to be powered by the battery pack 201 but may also be configured to be powered by an AC power supply (commercial power supply). Moreover, the tool 2 does not have to be an electric tool but may also be an air tool including an air motor (driving unit) to be operated by compressed air (power) supplied from an air compressor (power source).

Also, in the exemplary embodiment described above, the work target is supposed to be each of a plurality of portions to be fastened in a single workpiece. However, this is only an example and should not be construed as limiting. Alternatively, the work target may also be a module, part, or product with a plurality of portions to be fastened. If the work target is a module, part, or product with a plurality of portions to be fastened, for example, the plurality of portions to be fastened of a single work target may have either the same target torque value or mutually different target torque values.

Optionally, the tool 2 may include a torque sensor for measuring the fastening torque. In that case, the driving control unit 31 controls the driving unit 24 such that the fastening torque measured by the torque sensor becomes the torque setting. Furthermore, the torque decision unit 37 may determine, by comparing the result of measurement by the torque sensor with the target torque value, whether the fastening torque is normal or not. When finding the result of measurement by the torque sensor falling within a predetermined range based on the target torque value, the torque decision unit 37 decides that the fastening torque should be a normal one. On the other hand, when finding the result of measurement by the torque sensor falling outside of the predetermined range based on the target torque value, the torque decision unit 37 decides that the fastening torque should be an insufficient (abnormal) one.

Furthermore, the notification unit 211 does not have to be a light-emitting unit such as an LED but may also be implemented as an image display device such as a liquid crystal display or an organic electroluminescent (EL) display. Optionally, the notification unit 211 may make notification (presentation) by any means other than displaying. For example, the notification unit 211 may also be implemented as a loudspeaker or a buzzer that emits a sound (including a voice). In that case, the notification control unit 36 preferably makes the notification unit 211 emit different sounds in a situation where the decision made by the processing unit 35 indicates disagreement and in a situation where the processing unit 35 has identified the current work target. Still alternatively, the notification unit 211 may also be implemented as, for example, a vibrator that produces vibration or a transmitter for transmitting a notification signal to an external terminal (such as a mobile communications device) provided outside of the tool 2. Optionally, the notification unit 211 may also have, in combination, two or more functions selected from displaying, emitting a sound, producing vibration, and establishing communication.

The storage unit 4 may store working procedure data indicating a predetermined order in which working process steps are to be performed on a plurality of work targets. In that case, the processing unit 35 selects, in accordance with the working procedure, a reference image for use in identification processing out of the plurality of reference images. Specifically, the processing unit 35 preferentially selects one reference image, corresponding to a forthcoming work target to be processed in a forthcoming working process step, out of the plurality of reference images. As used herein, the "forthcoming work target" is a work target to be processed next to the work target that has been identified last time. The processing unit 35 performs image processing of comparing the reference image selected as template data with the captured image. That is to say, the processing unit 35 selects the reference image by predicting the current work target to be shot in the captured image next time in accordance with the working procedure. This allows the processing unit 35 to identify, in a shorter time, the current work target shot in the captured image.

Optionally, the processing unit 35 may also be configured to determine the type of the socket 242 attached to the tool 2 by performing image processing on the captured image. As used herein, the "type" is a piece of information for distinguishing different parts from each other and includes at least one piece of information about the size (dimension or length), shape, or material. In this embodiment, the processing unit 35 is configured to determine the length of the socket 242 attached to the tool 2. The processing unit 35 corrects, according to the length of the socket 242, the target torque value and sets the target torque value thus corrected as the torque setting. For example, the processing unit 35 corrects a target torque value associated with the current work target by multiplying the target torque value by a coefficient corresponding to the length of the socket 242 and sets the target torque value thus corrected as the torque setting. That is to say, the processing unit 35 controls the driving unit 24 such that the fastening torque becomes equal to the corrected target torque value. This may reduce dispersion in fastening torque according to the length of the socket 242.

Alternatively, the processing unit 35 may also be configured to determine the torque setting according to the detected length (or type) of the socket 242. In the storage unit 4, stored are torque values corresponding one to one to various lengths of the sockets 242. The processing unit 35 acquires, from the storage unit 4, a torque value corresponding to the determined length of the socket 242 and sets a value, based on the torque value thus acquired, as the torque setting. For example, the processing unit 35 may set the torque value, acquired from the storage unit 4, as the torque setting. This allows the fastening work to be performed at a torque value corresponding to the type of the given socket 242.

The tool system i only needs to include at least the tool 2 and the work target identification system 10. Also, in the exemplary embodiment described above, the tool system 1 is implemented as a single system including the tool 2 and the work target identification system 10. Alternatively, the tool system 1 may also be implemented as two or more systems. For example, the functions of the tool 2 and the work target identification system 10 may be distributed in two or more systems. Also, at least one function of the tool 2 or the work target identification system 10 may be distributed in two or more systems. For example, the function of the work target identification system 10 may be distributed in two or more devices. Optionally, at least some functions of the tool system 1 may be implemented as a cloud computing system as well.

Furthermore, if the captured image is a still picture (still image), then the stability decision unit 33 determines, based on at least two captured images shot within a predetermined period of time, whether the captured images are stabilized or not.

(Recapitulation)

As can be seen from the foregoing description, a tool system (1) according to a first aspect includes a tool (2), an image capturing unit (5), a processing unit (35), and a set state detection unit (34). The tool (2) is a portable tool (2) including a driving unit (24) to be activated with power supplied from a power source (battery pack 201). The image capturing unit (5) is provided for the tool (2) and generates a captured image. The processing unit (35) intermittently performs identification processing of identifying a work target based on the captured image. The set state detection unit (34) detects a state where the tool (2) is set in place on the work target.

This aspect allows the tool system (1) to identify a work target based on a captured image after having detected a state where the tool (2) is set in place on the work target. This enables reducing the number of times the tool system (1) performs the identification processing in vain, thus cutting down the power consumption.

In a tool system (1) according to a second aspect, which may be implemented in conjunction with the first aspect, the processing unit (35) performs the identification processing in response to detection by the set state detection unit (34) of the state where the tool (2) is set in place on the work target.

This aspect allows the tool system (1) to perform the identification processing only when detecting the state where the tool (2) is set in place on the work target. This enables reducing, with more reliability, the number of times the tool system (1) performs the identification processing in vain.

In a tool system (1) according to a third aspect, which may be implemented in conjunction with the first or second aspect, the tool (2) further includes a driving control unit (31). The driving control unit (31) changes settings of the tool (2) based on a working condition associated with the work target identified by the processing unit (35).

This aspect allows the settings of the tool (2) to be changed automatically according to the working condition associated with the work target identified by the processing unit (35), thus increasing the handiness of the tool system (1).

In a tool system (1) according to a fourth aspect, which may be implemented in conjunction with any one of the first to third aspects, the set state detection unit (34) detects, when finding a distance between the tool (2) and the work target falling within a preset range, the state where the tool (2) is set in place on the work target.

This aspect allows the tool system (1) to detect, when finding the distance between the tool (2) and the work target falling within a preset range, the state where the tool (2) is set in place on the work target and perform the identification processing. This enables reducing, with more reliability, the number of times the tool system (1) performs the identification processing in vain.

A tool system (1) according to a fifth aspect, which may be implemented in conjunction with the fourth aspect, further includes a distance sensor (271) that measures the distance between the tool (2) and the work target. The set state detection unit (34) detects, when finding the distance measured by the distance sensor (271) falling within the preset range, the state where the tool (2) is set in place on the work target.

This aspect makes it easier, by using the distance sensor (271), to measure the distance between the tool (2) and the work target.

In a tool system (1) according to a sixth aspect, which may be implemented in conjunction with any one of the first to fifth aspects, the set state detection unit (34) detects, when finding the tool (2) taking a predetermined orientation, the state where the tool (2) is set in place on the work target.

According to this aspect, when finding the tool (2) taking a predetermined orientation, the tool system (1) detects the state where the tool (2) is set in place on the work target and performs the identification processing. This enables reducing, with more reliability, the number of times the tool system (1) performs the identification processing in vain.

A tool system (1), according to a seventh aspect, which may be implemented in conjunction with the sixth aspect, further includes a motion sensor (261) that detects the tool's (2) orientation. The set state detection unit (34) detects, when finding the tool's (2) orientation detected by the motion sensor (261) to be the predetermined orientation, the state where the tool (2) is set in place on the work target.

This aspect allows the tool's (2) orientation to be detected by the motion sensor (261), thus making it easier to detect its orientation.

A tool system (1) according to an eighth aspect, which may be implemented in conjunction with any one of the first to seventh aspects, further includes a stability decision unit (33) that determines whether the captured image is stabilized or not. The set state detection unit (34) detects, in response to a decision made by the stability decision unit (33) that the captured image be stabilized, the state where the tool (2) is set in place on the work target.

This aspect allows, when a decision is made by the stability decision unit (33) that the captured image be stabilized, the tool system (1) to detect the state where the tool (2) is set in place on the work target and perform the identification processing. This enables reducing, with more reliability, the number of times the tool system (1) performs the identification processing in vain.

In a tool system (1) according to a ninth aspect, which may be implemented in conjunction with the eighth aspect, the captured image includes a plurality of frames. The stability decision unit (33) calculates a degree of difference between the plurality of frames and decides, when finding the degree of difference equal to or less than a threshold value (T9; T10), that the captured image be stabilized.

This aspect enables determining, by a simple method, whether the captured image is stabilized or not.

In a tool system (1) according to a tenth aspect, which may be implemented in conjunction with any one of the first to ninth aspects, the set state detection unit (34) detects, when sensing the tool (2) be pressed against the work target, the state where the tool (2) is set in place on the work target.

According to this aspect, when sensing the tool (2) be pressed against the work target, the tool system (1) detects the state where the tool (2) is set in place on the work target and performs the identification processing. This enables reducing, with more reliability, the number of times the tool system (1) performs the identification processing in vain.

A tool system (1) according to an eleventh aspect, which may be implemented in conjunction with the tenth aspect, further includes a pressure sensor (281) that detects a pressure applied to the tool (2). The set state detection unit (34) detects, when finding the pressure detected by the pressure sensor (281) equal to or greater than a threshold pressure (T13; T14), the state where the tool (2) is set in place on the work target.

This aspect makes it easier for the tool system (1) to sense, by making the pressure sensor (281) detect the pressure, the tool (2) be pressed against the work target.

In a tool system (1) according to a twelfth aspect, which may be implemented in conjunction with any one of the first to eleventh aspects, the tool (2) further includes an operating unit (221) that activates the driving unit (24). The operating unit (221) has an initial position and an ON position and activates the driving unit (24) when pressed down to the ON position. The set state detection unit (34) detects, when finding the operating unit (221) pressed halfway between the initial position and the ON position, the state where the tool (2) is set in place on the work target.

According to this aspect, when finding the operating unit (221) of the tool (2) pressed halfway between the initial position and the ON position, the tool system (1) detects the state where the tool (2) is set in place on the work target and performs the identification processing. This enables reducing, with more reliability, the number of times the tool system (1) performs the identification processing in vain.

Note that the constituent elements according to the second to twelfth aspects are not essential constituent elements for the tool system (1) but may be omitted as appropriate.

A tool (2) according to a thirteenth aspect is designed to be used in the tool system (1) according to any one of the first to twelfth aspects. The tool (2) includes the driving unit (24) and the image capturing unit (5).

This aspect allows the tool system (1) to identify a work target based on a captured image after having detected a state where the tool (2) is set in place on the work target. This enables reducing the number of times the tool system (1) performs the identification processing in vain.

A work target identification system (10) according to a fourteenth aspect includes a processing unit (35) and a set state detection unit (34). The processing unit (35) intermittently performs identification processing of identifying a work target based on a captured image generated by an image capturing unit (5). The image capturing unit (5) is provided for a tool (2) which is a portable tool (2) including a driving unit (24) to be activated with power supplied from a power source. The set'state detection unit (34) detects a state where the tool (2) is set in place on the work target.

This aspect allows the work target identification system (10) to identify a work target based on a captured image after having detected a state where the tool (2) is set in place on the work target. This enables reducing the number of times the work target identification system (10) performs the identification processing in vain, thus cutting down the power consumption.

A work target identification method according to a fifteenth aspect includes an identification processing step and a set state detection step. The identification processing step includes intermittently performing identification processing of identifying a work target based on a captured image generated by an image capturing unit (5). The image capturing unit (5) is provided for a tool (2) which is a portable tool (2) including a driving unit (24) to be activated with power supplied from a power source. The set state detection step includes detecting a state where the tool (2) is set in place on the work target.

This aspect enables identifying a work target based on a captured image after having detected a state where the tool (2) is set in place on the work target. This enables reducing the number of times the identification processing is performed in vain, thus cutting down the power consumption.

A program according to a sixteenth aspect is designed to cause one or more processors to perform the work target identification method according to the fifteenth aspect.

This aspect allows the one or more processors to identify a work target based on a captured image after having detected a state where the tool (2) is set in place on the work target. This allows reducing the number of times the one or more processors perform the identification processing in vain, thus cutting down the power consumption.

REFERENCE SIGNS LIST

1 Tool System
2 Tool
201 Battery Pack (Power Source)
221 Trigger Switch (Operating Unit)
24 Driving Unit
261 Motion Sensor
271 Distance Sensor
281 Pressure Sensor
31 Driving Control Unit
33 Stability Decision Unit
34 Set State Detection Unit
35 Processing Unit
5 Image Capturing Unit
10 Work Target Identification System

The invention claimed is:

1. A tool system comprising:
a tool including a motor configured to rotate an output shaft to which a tip tool is removably attached, the tool being a portable tool;
a camera provided for the tool and configured to generate a captured image; and
a processor configured to intermittently perform identification processing of identifying a work target based on the captured image, wherein
the processor is configured to detect a state where the tip tool is set in place on the work target and perform the identification processing in response to detection of the state where the tip tool is set in place on the work target.

2. The tool system of claim 1, wherein
the processor is further configured to change settings of the tool based on a working condition associated with the work target identified by the processor.

3. The tool system of claim 1, wherein
the processor is configured to, when finding a distance between the tip tool and the work target falling within a preset range, detect the state where the tip tool is set in place on the work target.

4. The tool system of claim 3, further comprising a distance sensor configured to measure the distance between the tip tool and the work target, wherein
the processor is configured to, when finding the distance measured by the distance sensor falling within the preset range, detect the state where the tip tool is set in place on the work target.

5. The tool system of claim 1, wherein
the processor is configured to, when finding the tool taking a predetermined orientation, detect the state where the tip tool is set in place on the work target.

6. The tool system of claim 5, further comprising a motion sensor configured to detect a tool's orientation, wherein
the processor is configured to, when finding the tool's orientation detected by the motion sensor to be the predetermined orientation, detect the state where the tip tool is set in place on the work target.

7. The tool system of claim 1, wherein
the processor is configured to determine whether the captured image is stabilized or not, and
in response to a decision that the captured image be stabilized, detect the state where the tip tool is set in place on the work target.

8. The tool system of claim 7, wherein
the captured image includes a plurality of frames, and
the processor is configured to calculate a degree of difference between the plurality of frames and decide, when finding the degree of difference equal to or less than a threshold value, that the captured image be stabilized.

9. The tool system of claim 1, wherein
the processor is configured to, when sensing the tool be pressed against the work target, detect the state where the tip tool is set in place on the work target.

10. The tool system of claim 9, further comprising a pressure sensor configured to detect a pressure applied to the tool, wherein
the processor is configured to, when finding the pressure detected by the pressure sensor equal to or greater than a threshold pressure, detect the state where the tip tool is set in place on the work target.

11. The tool system of claim 1, wherein
the tool further includes an operating unit configured to activate the motor,
the operating unit has an initial position and an ON position and is configured to activate the motor when pressed down to the ON position, and
the processor is configured to, when finding the operating unit pressed halfway between the initial position and the ON position, detect the state where the tip tool is set in place on the work target.

12. A tool for use in the tool system of claim 1, the tool comprising:
the motor; and
the camera.

13. A work target identification system comprising:
a processor configured to intermittently perform identification processing of identifying a work target based on a captured image generated by a camera, the camera being provided for a tool, the tool being a portable tool including a motor configured to rotate an output shaft to which a tip tool is removably attached; wherein the processor is further configured to detect a state where the tip tool is set in place on the work target and perform the identification processing in response to detection of the state where the tool is set in place on the work target.

14. A work target identification method comprising:

an identification processing step including intermittently performing identification processing of identifying a work target based on a captured image generated by a camera, the camera being provided for a tool, the tool being a portable tool including a motor configured to rotate an output shaft to which a tip tool is removably attached; and a set state detection step including detecting a state where the tip tool is set in place on the work target, wherein the identification processing step includes performing the identification processing in response to detection of the state where the tool is set in place on the work target.

15. A non-transitory storage medium storing thereon a program designed to cause one or more processors to perform the work target identification method of claim 14.

16. A tool system comprising:

a tool including a motor configured to be activated with power supplied from a power source, the tool being a portable tool;

a camera provided for the tool and configured to generate a captured image; and a processor configured to intermittently perform identification processing of identifying a work target based on the captured image, wherein the processor is configured to:

detect a state where the tool is set in place on the work target; and perform the identification processing of identifying the work target only in response to detection of the state where the tool is set in place on the work target.

* * * * *